United States Patent
Yoo et al.

(10) Patent No.: US 10,372,487 B2
(45) Date of Patent: Aug. 6, 2019

(54) DEVICE AND METHOD OF RUNNING MULTIPLE OPERATING SYSTEMS AND PRESENTING MULTIPLE OPERATION SCREENS

(71) Applicant: SAMSUNG ELECTRONICS CO., LTD., Suwon-si (KR)

(72) Inventors: Jae-yong Yoo, Gwangju (KR); Chan-ju Park, Seoul (KR); Sung-min Lee, Suwon-si (KR); Bok-deuk Jeong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 14/982,771

(22) Filed: Dec. 29, 2015

(65) Prior Publication Data

US 2016/0253207 A1 Sep. 1, 2016

Related U.S. Application Data

(60) Provisional application No. 62/126,069, filed on Feb. 27, 2015.

(30) Foreign Application Priority Data

May 1, 2015 (KR) .......... 10-2015-0062275

(51) Int. Cl.
*G06F 9/46* (2006.01)
*G06F 9/48* (2006.01)
(Continued)

(52) U.S. Cl.
CPC .......... *G06F 9/4843* (2013.01); *G06F 3/0412* (2013.01); *G06F 3/04842* (2013.01);
(Continued)

(58) Field of Classification Search
None
See application file for complete search history.

(56) References Cited

U.S. PATENT DOCUMENTS 8,433,889 B2  4/2013  Princen et al.
2004/0226041 A1  11/2004  Smith et al.
(Continued)

FOREIGN PATENT DOCUMENTS

EP  2527974 A2  11/2012
JP  2005-11336 A  1/2005
(Continued)

OTHER PUBLICATIONS

M4cbook; How to: Share/Drag & Drop Files and Folders with Parallels Desktop (Mac); youtube.com/watch?v=j1rE2lja-fU; Dec. 5, 2011 (Year: 2011).*

(Continued)

*Primary Examiner* — Bing Zhao
(74) *Attorney, Agent, or Firm* — Sughrue Mion, PLLC

(57) ABSTRACT

A device configured to execute a plurality of operating systems, including a display configured to display a screen corresponding to an active operating system among the plurality of operating systems; and a controller configured to control the display to display an operation screen of the active operating system on the display when the active operating system is activated and to display an operation screen of a secondary operating system on the display when the device receives a user input according to a predetermined interface for switching from the active operating system to the secondary operating system.

11 Claims, 25 Drawing Sheets

(51) Int. Cl.
    *G06F 9/4401* (2018.01)
    *G06F 9/455* (2018.01)
    *G06F 3/041* (2006.01)
    *G06F 3/0484* (2013.01)
    *G06T 3/40* (2006.01)
    *G06F 9/451* (2018.01)

(52) U.S. Cl.
    CPC .............. *G06F 9/441* (2013.01); *G06F 9/451* (2018.02); *G06F 9/45545* (2013.01); *G06T 3/40* (2013.01)

(56) References Cited

U.S. PATENT DOCUMENTS

| | | |
|---|---|---|
| 2005/0172294 A1 | 8/2005 | Kanemura et al. |
| 2006/0010314 A1 | 1/2006 | Xu |
| 2012/0110496 A1 | 5/2012 | Lee et al. |
| 2014/0025860 A1 | 1/2014 | Hara et al. |
| 2014/0082690 A1 | 3/2014 | Ju et al. |

FOREIGN PATENT DOCUMENTS

| | | |
|---|---|---|
| KR | 10-2014-0144562 A | 12/2014 |
| WO | 2012044829 A2 | 4/2012 |

OTHER PUBLICATIONS

"How much memory shall I assigning to my Virtual Machine", kb.paralles.com:80/en/113649, created on Apr. 6, 2012 and archived by Internet Archive WaybackMachine on Jul. 3, 2013 (Year: 2013).*
Share Files and Folders; download.parallels.com:80/desktop/v10/docs/en US/Parallels Desktop User's Guide/32922.htm, Jan. 24, 2015 (Year: 2015).*
Unable to see Mac Shared folder in Windows, kb.parallels.com/en/120413, Mar. 4, 2014 (Year: 2014).*
International Search Report dated Apr. 4, 2016 issued by International Searching Authority in counterpart International Patent Application No. PCT/KR2015/014270 (PCT/ISA/210).
Written Opinion dated Apr. 4, 2016 issued by International Searching Authority in counterpart International Patent Application No. PCT/KR2015/014270 (PCT/ISA/237).
Aleksi Aalto, "Dynamic management of multiple operating systems in an embedded multi-core environment", May 7, 2010, XP055238479, http://lib.tkk.fi/Dipl/2010/urn100250.pdf, total 80 pages.
Communication dated Jun. 27, 2016, issued by the European Patent Office in counterpart European Application No. 16155500.8.
Communication dated Jul. 6, 2017 by the European Patent Office in counterpart European Patent Application No. 16155500.8.
Anonymous, "Oracle VM VirtualBox®", Jan. 1, 2012, pp. 1-298, XP055023561, Retrieved from the Internet: URL: https://www.virtualbox.org/wiki/Documentation [retrieved on Apr. 2, 2012].

* cited by examiner

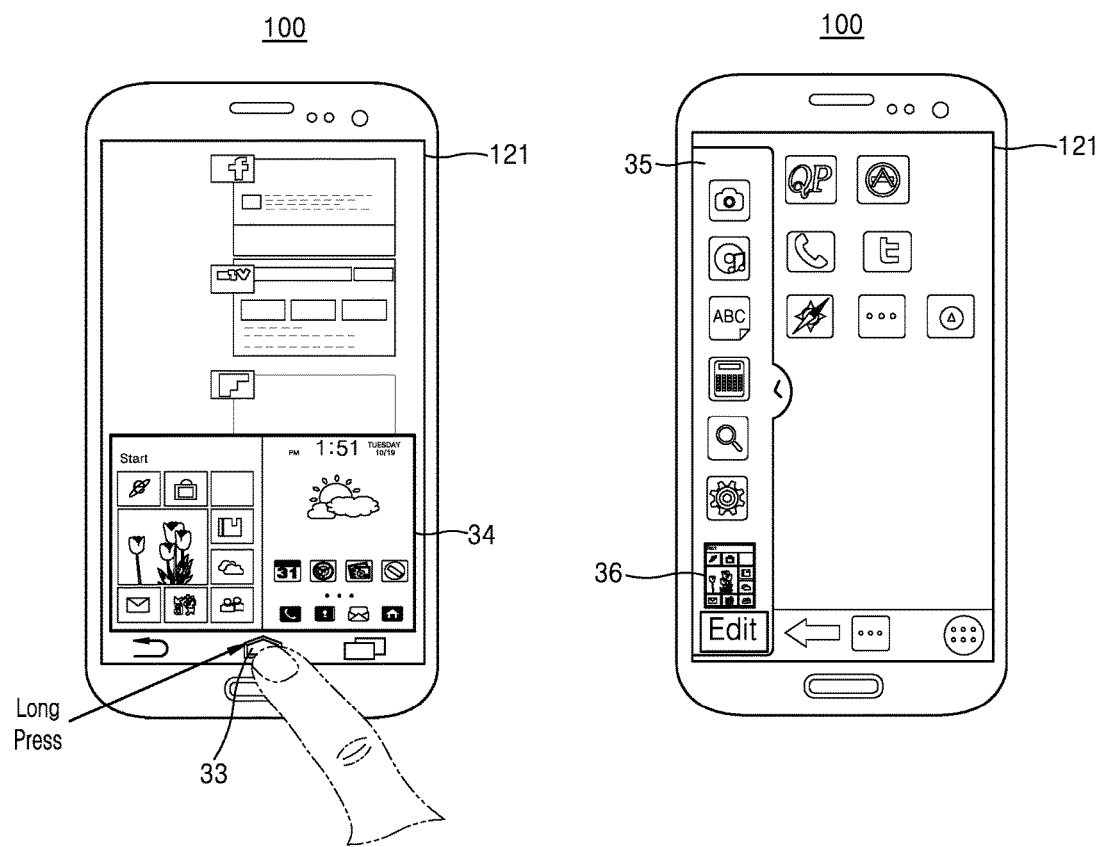

FIG. 16A
FIG. 16B
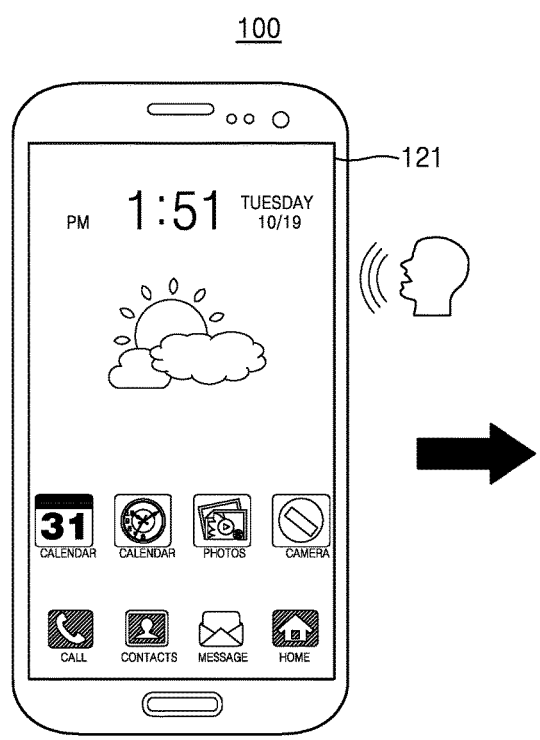
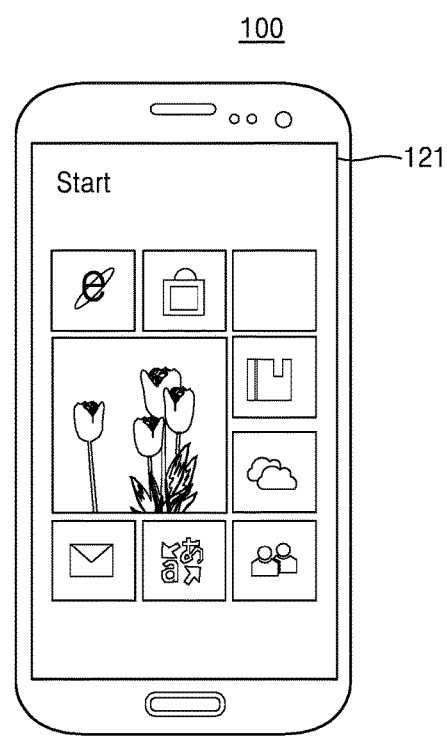

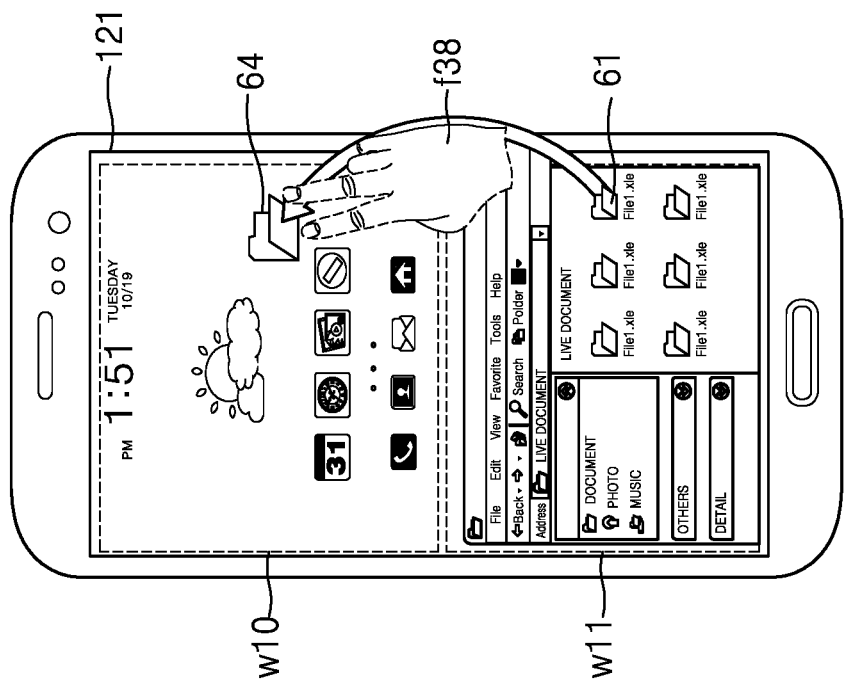
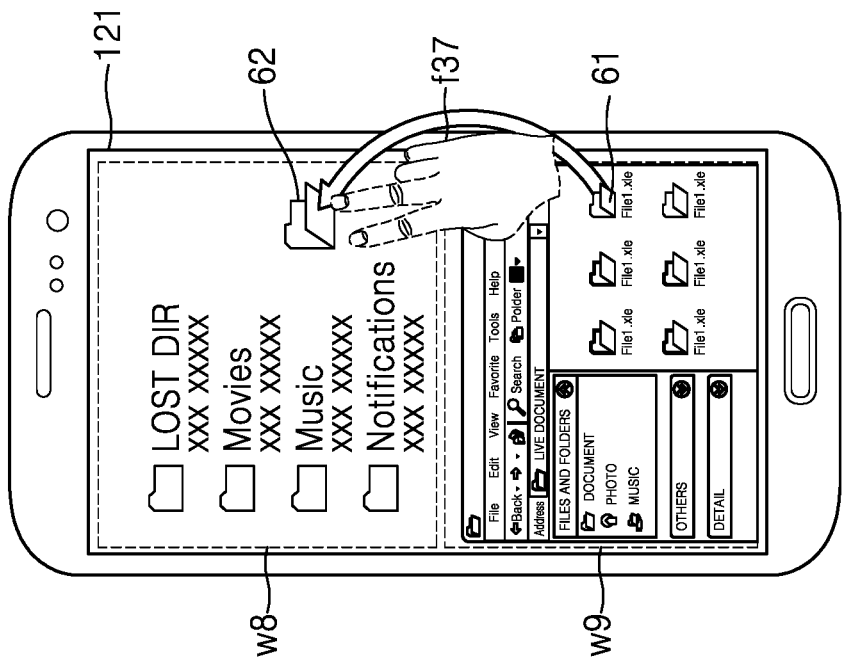
FIG. 22A
FIG. 22B

DEVICE AND METHOD OF RUNNING MULTIPLE OPERATING SYSTEMS AND PRESENTING MULTIPLE OPERATION SCREENS

CROSS-REFERENCE TO RELATED APPLICATION

This application claims priority from Korean Patent Application No. 10-2015-0062275, filed on May 1, 2015, in the Korean Intellectual Property Office, and the benefit of U.S. Provisional Application No. 62/126,069, filed on Feb. 27, 2015, in the United States Patent and Trademark Office, the disclosures of which are incorporated herein by reference in their entireties.

BACKGROUND

1. Field

Apparatuses and methods consistent with exemplary embodiments relate to a device and method of running a plurality of operating systems, more particularly, to a device and method of switching and displaying screens of operating systems according to a predetermined user interface.

2. Description of the Related Art

An operating system is a program that allows a user to use a computer by controlling hardware and software of the computer. The operating system may function as an interface between hardware and application programs and may manage computer resources, such as a central processing unit (CPU), a main memory unit, an input/output device, etc.

Recently, as users desire to use various computing environments according to objectives or necessity, research into technology for running two or more operating systems in one device is required.

SUMMARY

According to an aspect of an exemplary embodiment, a device configured to execute a plurality of operating systems includes a display configured to display a screen corresponding to an active operating system among the plurality of operating systems; and a controller configured to control the display to display an operation screen of the active operating system on the display when the active operating system is activated and to display an operation screen of a secondary operating system on the display when the device receives a user input according to a predetermined interface for switching from the active operating system to the secondary operating system.

In response to receiving the user input according to the predetermined interface for switching from the active operating system to the secondary operating system, the controller may be configured to control the display to divide the display into a plurality of display regions including a first display region and a second display region, to display the operation screen of the active operating system on the first display region, and to display the operation screen of the secondary operating system on the second display region.

The controller may be configured to control the display to increase or decrease a size of the first display region or a size of the second display region in accordance with a predetermined input signal.

When the controller receives user inputs of selecting an object displayed in the first display region, and moving the selected object to the second display region, the controller may be further configured to copy the object from the first display region to the second display region.

The controller may be further configured to copy content corresponding to the object selected on the first display region and store the copied content in a memory area that is controlled by the secondary operating system.

The predetermined interface for switching from the active operating system to the secondary operating system may be set according to a selection input of the user from among interfaces for switching the operating systems.

In response to receiving the user input according to the predetermined interface for switching from the active operating system to the secondary operating system, the controller may be further configured to control the active operating system to be in an inactive state and to change a state of the secondary operating system to an active state.

In response to a predetermined input event, the controller may be configured to set a signal designating that user inputs are to be filtered from the active operating system.

According to another aspect of an exemplary embodiment, a method of executing a plurality of operating systems in a device configured to execute the plurality of operating systems, the method includes displaying an operation screen of an active operating system among the plurality of operating systems on a display when the active operating system is activated; receiving a user input according to a predetermined interface for switching from the active operating system to a secondary operating system among the plurality of operating systems; and in response to receiving the user input according to the predetermined interface for switching from the active operating system to the secondary operating system, displaying an operation screen of the secondary operating system on the display.

The method may further include, in response to receiving the user input according to the predetermined interface for switching from the active operating system to the secondary operating system, dividing the display into a plurality of display regions, including a first display region and a second display region, wherein, displaying the operation screen of the secondary operating system may further include displaying the operation screen of the active operating system on the first display region, and displaying the operation screen of the secondary operating system on the second display region.

The method may further include increasing or decreasing at least one among a size of the first display region or a size of the second display region in accordance with a predetermined input signal.

The method may further include receiving user inputs selecting an object displayed on the first display region and moving the selected object to the second display region; and copying the object to the second display region.

The method may further include copying content corresponding to the object and storing the copied content in a memory area controlled by the secondary operating system.

The interface for switching from the active operating system to the secondary operating system is set according to a selection input of a user from among interfaces for switching between operating systems.

The method may further include controlling the active operating system to be in an inactive state and changing a state of the secondary operating system to an active state when the predetermined user input of switching from the active operating system to the secondary operating system is received.

The method may further include, when a predetermined input event occurs, setting a signal designating that user inputs are to be filtered from the active operating system.

According to an aspect of an exemplary embodiment, a method of controlling a device, the method includes controlling a controller to activate a host operating system on the device, controlling a display to display a first user interface associated with the host operating system; receiving a switching input to switch between the host operating system and the guest operating system from a user; controlling the controller to activate the guest operating system as an application, the application being executed on the host operating system; and controlling the display to display a second user interface associated with the guest operating system.

Controlling the display to display the second user interface may include controlling the display to display the first user interface on a first display region of the display, and controlling the display to display the second user interface on a second display region of the display.

The method may further include, in response to receiving the switching input, locking the host operating system so that user inputs are provided to the guest operating system and are filtered from the host operating system.

BRIEF DESCRIPTION OF THE DRAWINGS

These and other aspects will become apparent and more readily appreciated from the following description of the exemplary embodiments, taken in conjunction with the accompanying drawings in which:

FIGS. 10A-1, 10A-2, 10A-3, and 10B illustrate examples of interfaces for switching operating systems;

FIGS. 11A-1, 11A-2, 11A-3, and 11B illustrate examples of interfaces for switching operating systems;

FIGS. 12A-1, 12A-2, 12A-3, and 12B illustrate examples of interfaces for switching operating systems;

FIGS. 13A-13B illustrate examples of interfaces for switching operating systems;

FIGS. 16A-16B illustrate examples of interfaces for switching operating systems;

FIGS. 22A-22B and 23 illustrate other exemplary embodiments; and

DETAILED DESCRIPTION

Figure 1A:
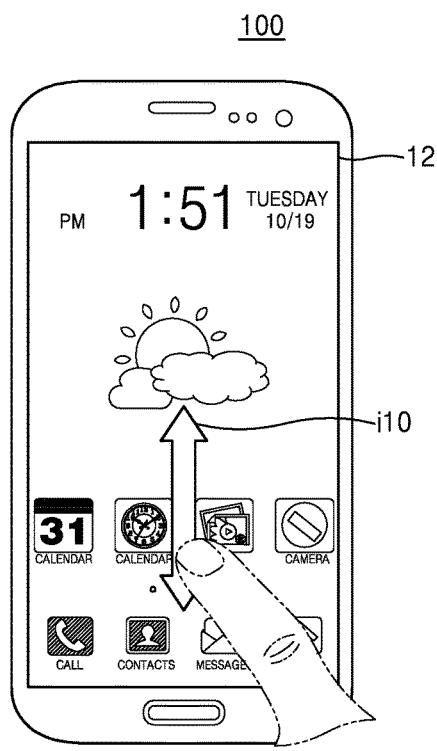
FIGS. 1A and 1B illustrate an exemplary embodiment of switching of operating systems.

Exemplary embodiments will now be described more fully with reference to the accompanying drawings. The exemplary embodiments may, however, be embodied in many different forms and should not be construed as being limited to the exemplary embodiments set forth herein; rather, these exemplary embodiments are provided so that this disclosure will be thorough and complete. Like reference numerals in the drawings generally denote like elements, and thus their description will be omitted.

The attached drawings for illustrating exemplary embodiments concept are referred to in order to gain a sufficient understanding of the exemplary embodiments, the merits thereof, and the objectives accomplished by the implementation thereof. In the description of the exemplary embodiments, certain detailed explanations of the related art are omitted when it is deemed that they may unnecessarily obscure the essence of the exemplary embodiments. While such terms as "first", "second", etc., may be used to describe various components, such components must not be limited to the above terms. The above terms are used only to distinguish one component from another.

Hereinafter, a device will be described in detail with reference to the attached drawings. The terms " . . . unit" and " . . . module" are used herein to describe various elements, and the elements are not limited by these terms.

The device described herein may include a mobile phone, a smart phone, a tablet PC, a laptop computer, a digital broadcasting terminal, a personal digital assistant (PDA), a portable multimedia player (PMP), a navigation device, or the like. However, one of ordinary skill in the art would easily know that, except for elements that can only be applied to a mobile terminal, elements of exemplary embodiments may be applied to a fixed terminal such as a digital TV, or a desktop.

It will be understood that when a portion is referred to as being "connected to" another portion, the component can be directly connected to the other portion or can be "electrically connected to" the other portion by interposing a component therebetween. Throughout the specification, when a portion "includes" an element, another element may be further included, rather than excluding the existence of the other element, unless otherwise described.

Hereinafter, exemplary embodiments will be described in detail with reference to the attached drawings.

Figure 1B:
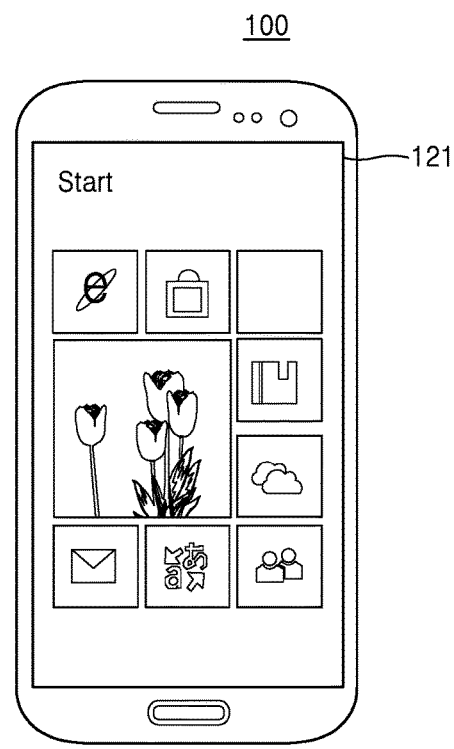

FIGS. 1A and 1B illustrate an exemplary embodiment of switching between or among operating systems.

A device 100 may run a plurality of operating systems and may display an operation screen of an activated operating system on a display 121. FIG. 1A illustrates an example of the display 121, on which an operation screen of a first operating system is displayed, and FIG. 1B illustrates an example of the display 121, on which an operation screen of a second operating system is displayed.

Throughout this specification, the first operating system is, for example, Android, and the second operating system is, for example, Windows, for convenience. However, the exemplary embodiments are not limited thereto. For example, either the first operating system or the second operating system may be Tizen, Web OS, Unix, Linux, Mac OS, or any other desired operating system.

As illustrated in FIG. 1A, when the device 100 receives a touch input of a user (e.g., a sliding input i10 in a vertical direction), the device 100 may switch the operating system, as illustrated in FIG. 1B. Accordingly, the device 100 may switch a screen A of the first operating system displayed on the display 121 to a screen B of the second operating system.

According to an exemplary embodiment, as the device 100 receives a user input of switching the first operating system to the second operating system, the device 100 may activate a selected second operating system. In this case, the first operating system may be placed in an inactive state.

The inactive state may indicate that a current operation state is temporarily stopped. Because application programs that were being executed are temporarily stopped instead of being terminated, state information of a processor or content stored in a memory may be kept, and the application programs that have temporarily stopped may be executed again when the application programs are activated again.

Thus, there is no need to reboot the device 100 many times in order to run different operating systems, and also the time required to boot a different operating system may be reduced. In addition, a process of re-executing application programs necessary to restart a previous process may be omitted. Accordingly, multiple operating systems may be conveniently run.

FIG. 1A illustrates that operating systems are switched as the device 100 receives the sliding input i10 in a vertical direction, but exemplary embodiments are not limited thereto. According to an exemplary embodiment, various user interfaces for switching operating systems may be used, and this will be described in detail with reference to FIGS. 8 to 16.

According to an exemplary embodiment, because users may directly select and set a user interface for switching operating systems, an interface that is intuitive and convenient may be provided to each user.

Also, according to an exemplary embodiment, the display 121 smoothly switches and displays operation screens of different operating systems in accordance with a gesture input set by a user, and thus, a convenient and natural effect of switching operating systems may be provided to the user.

Figure 2:
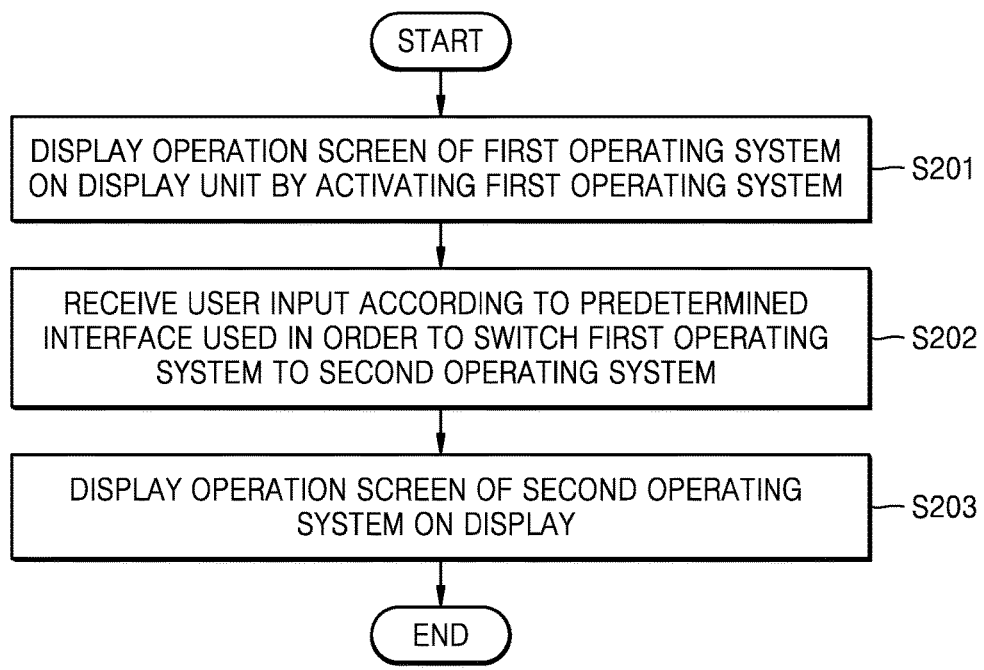
FIG. 2 illustrates a flowchart of a method of controlling a device, according to an exemplary embodiment.

FIG. 2 illustrates a flowchart of a method of controlling the device 100, according to an exemplary embodiment.

The device 100 may switch operating systems based on a user input varying with an interface that is previously set by the user. According to an exemplary embodiment, as the user directly selects one of the interfaces (e.g., a touch input, a drag input, a menu selection input, a voice input, etc.) as an interface for switching the operating systems, the device 100 may provide each user with an intuitive and convenient method of switching operating systems.

In operation S201 of FIG. 2, the device 100 may display an operation screen of the first operating system on the display 121 as the first operating system is activated. In operation S202, the device 100 may receive a user input varying with a predetermined interface for switching the first operating system to the second operating system. In operation S203, the device 100 may display the operation screen of the second operating system on the display 121.

For example, when the user sets, in advance, a tap input of tapping twice the display 121 with a finger as an interface for switching operating systems, the device 100 receives a tap input twice and may display an operation screen of a switched operating system.

According to an exemplary embodiment, when the device 100 receives a user input according to a predetermined interface for switching the first operating system to the second operating system while the operation screen of the first operating system is being displayed, a currently activated operating system, that is, the first operating system, is deactivated, and an deactivated operating system, that is, the second operating system, may be activated. As a result, a controller 130 may display the operation screen of the operating system on the display 121.

The device 100 may repeat the above-described operations whenever an input signal for switching operating systems is provided.

Figure 3:
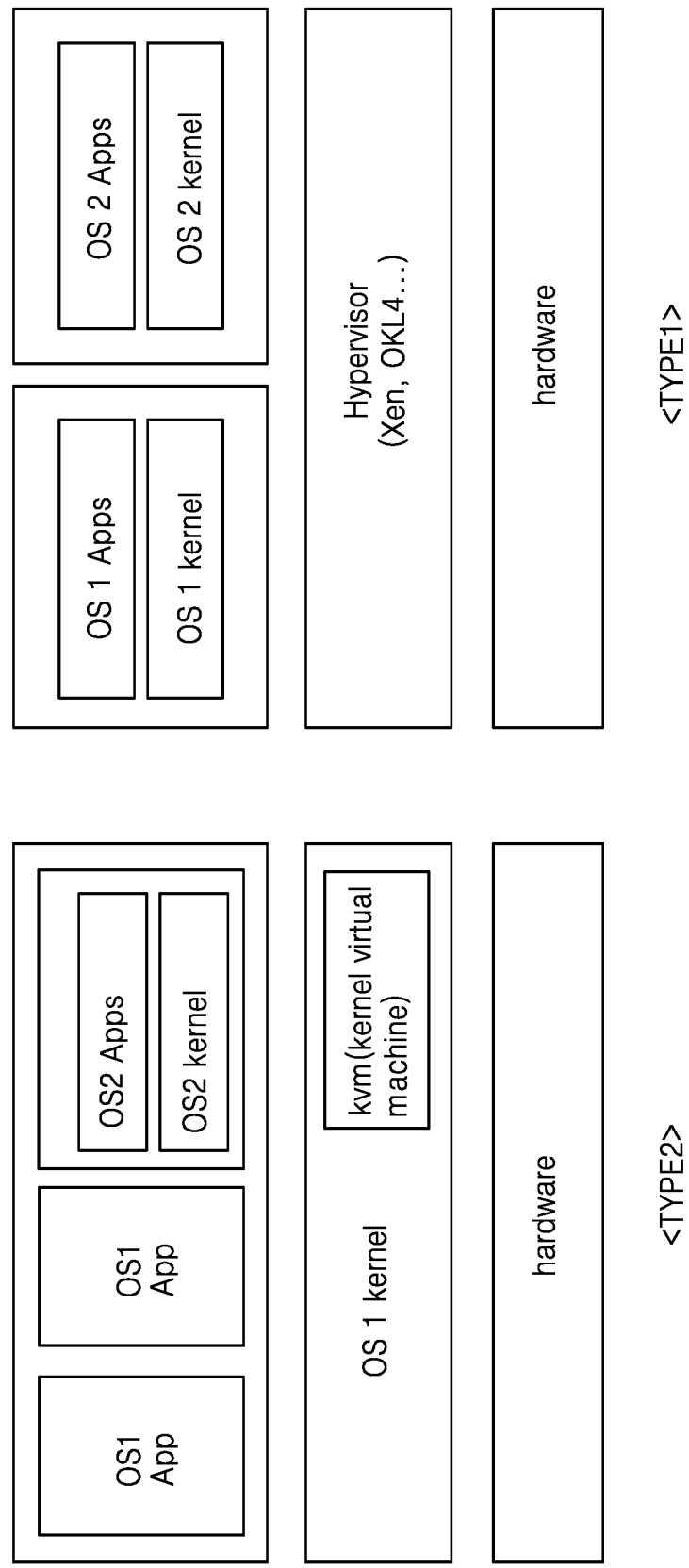
FIGS. 3 and 4 illustrate conceptual views of a method of running operating systems.
Figure 4:
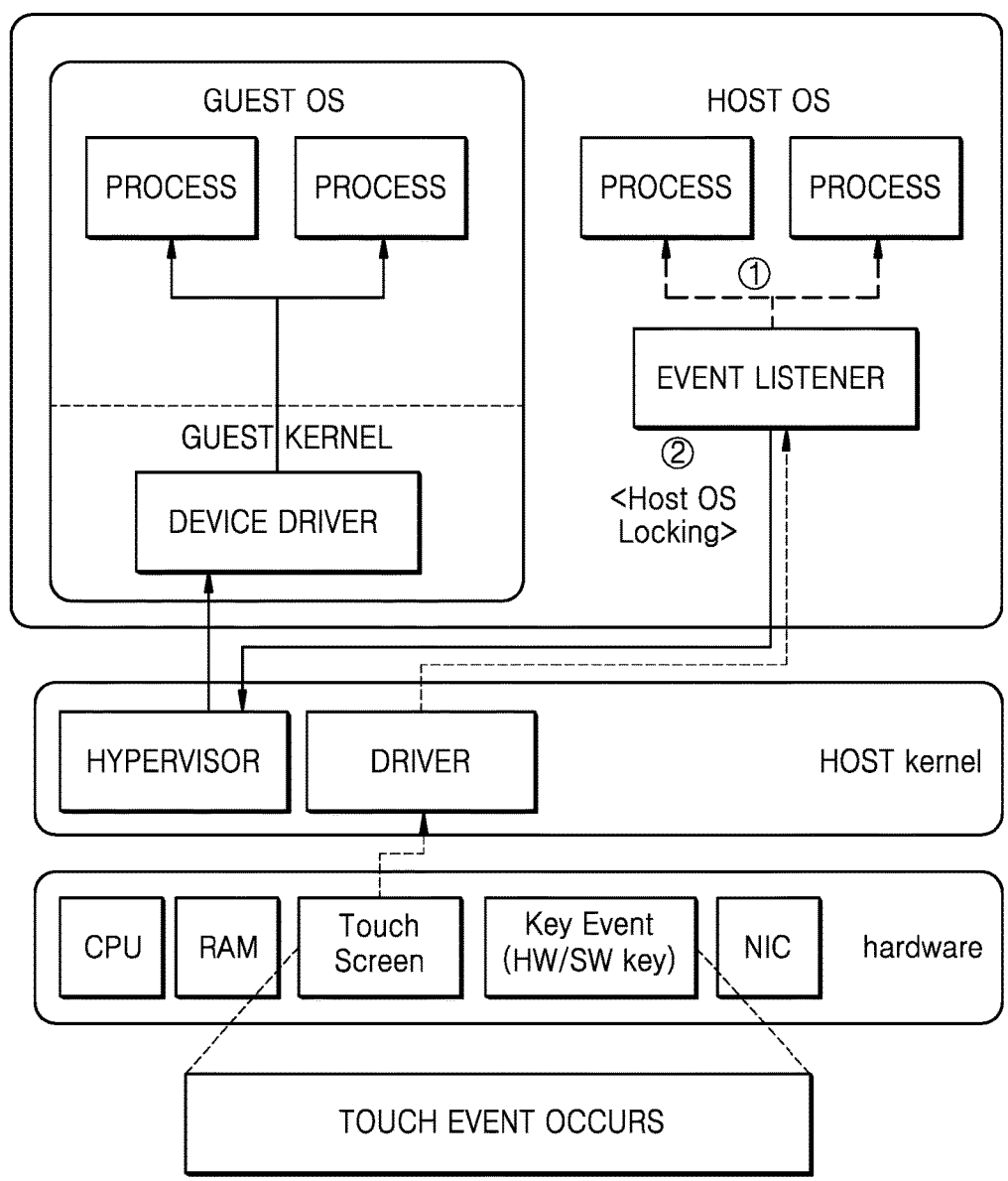

FIGS. 3 and 4 illustrate conceptual views of a method of running operating systems.

As illustrated in FIG. 3, the device 100 may run a plurality of operating systems according to methods such as Type 1 or Type 2.

According to Type 2, the device 100 may execute, on a first operating system OS1, a virtual machine for providing a virtual computing environment in order to run the operating systems in one device.

The virtual machine indicates a virtual computing execution environment generated when hardware resources of a device are assigned thereto and may include, a second operating system OS2 kernel and a predetermined application OS2 Apps that may be executed on the second operating system OS2 kernel.

According to an exemplary embodiment, according to Type 2, the device 100 may execute, on the first operating system OS1, a second operating system OS2 (i.e., a guest operating system GUEST OS) as an application. According to an exemplary embodiment, the second operating system OS2 may access hardware via a kernel virtual machine (KVM) that is a Linux kernel module for controlling the virtual machine to be used.

Hardware may include a processor, a memory, a display, an input device, or the like and may also include an additional hardware device such as a microphone, a speaker, a power supply, an external removable memory, an antenna, a radio wave transmitter/receiver, a global positional system (GPS), a camera, a motion sensor, an earth magnetic field sensor, a proximity sensor, or an illumination sensor.

According to Type 1, the device 100 may generate virtual machines that are multiple independent execution environments in order to run operating systems in one device. Each of the generated virtual machines may include an independent operating system and an application executed on the independent operating system. For example, a virtual machine, which includes a first operating system OS1 kernel and a predetermined application OS1 Apps that may be executed on the first operation system OS1 kernel, and a virtual machine, which includes a second operating system OS2 kernel and a predetermined application OS2 Apps that may be executed on the second operating system OS2 kernel, may be generated.

A hypervisor may be software for managing operating systems and applications executed on the virtual machines. The first operating system OS1 and the second operating system OS2, which are independent execution environments, may respectively access hardware under the control of the hypervisor. That is, the hypervisor may be disposed between physical hardware and at least one of the first operating system OS1 and the second operating system OS2.

FIG. 4 illustrates controlling a host operating system HOST OS (the first operating system) and a guest operating system GUEST OS (the second operating system) according to the occurrence of touch events, when multiple operating systems are run in a manner such as Type 2.

According to an exemplary embodiment, the device 100 may set an input signal of the user according to a touch event such that the input signal is not transmitted to the host operating system HOST OS, but is instead transmitted to the guest operating system GUEST OS. Hereinafter, setting an input signal of the user not to be transmitted to the host operating system HOST OS may be referred to as 'locking of the host operating system HOST OS'.

For example, if a touch event occurs via the display (a touch screen) 121 when the locking of the host operating system HOST OS is set, the device 100 may not transmit the input signal according to the occurrence of the touch event, in accordance with the control of an event listener.

In this case, the device 100 may transmit the input signal to the guest operating system GUEST OS in accordance with the control of the hypervisor. The input signal transmitted to the guest operating system GUEST OS may not affect the host operating system HOST OS. Accordingly, the user may use a certain interface environment provided by the guest operating system GUEST OS.

For example, in an interface environment provided by the host operating system HOST OS (e.g., Android OS), when an upper portion of a screen is touched, a setting window (e.g., a notification bar of the Android OS) may pop up. According to an exemplary embodiment, when the locking of the host operating system HOST OS is set, device 100 may not display the setting window even though a touch event occurs on an upper portion of the screen via the display (the touch screen) 121.

The device 100 may set a user interface for setting the locking of the host operating system HOST OS in advance. Also, the device 100 may set a user interface for cancelling the locking of the host operating system HOST OS.

According to an exemplary embodiment, the device may set the locking of the host operating system HOST OS based on a user input according to a predetermined interface, and when the device 100 receives a user input according to the predetermined interface again, the locking may be cancelled.

Examples of user interfaces illustrated in FIGS. 8 to 16 may be set as interfaces for setting or cancelling the locking of the host operating system.

Figure 5:
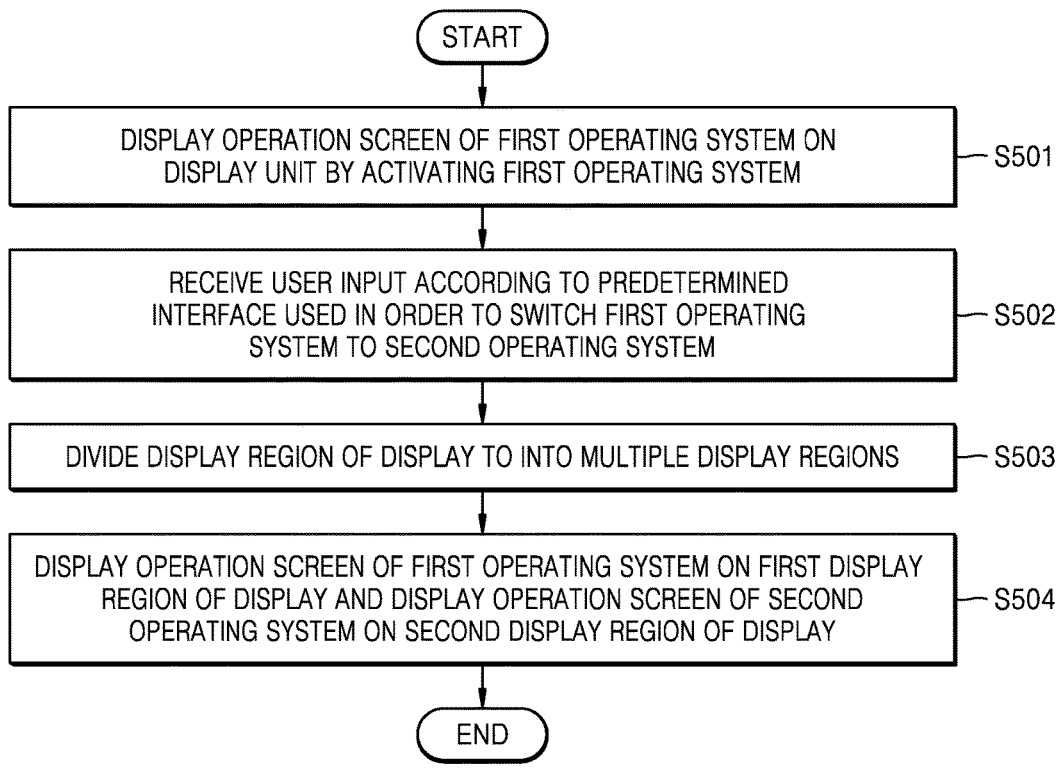
FIG. 5 illustrates a flowchart of a method of controlling a device on which a plurality of screens are displayed, according to an exemplary embodiment.

FIG. 5 illustrates a flowchart of a method of controlling the device 100 on which a plurality of screens are displayed, according to an exemplary embodiment.

In operation S501 of FIG. 5, the device 100 may display an operation screen of a first operating system on the display 121 as the first operating system is activated.

In operation S502, the device 100 may receive a user input according to a predetermined interface for switching the first operating system to a second operating system.

For example, the device 100 may receive a user input of setting an interface (e.g., a sliding touch input in a vertical direction) for switching operating systems in advance and may store the received user input.

In operation S503, the device 100 may divide a display region of the display 121 into a plurality of display regions. According to an exemplary embodiment, the device 100 may provide a multi-window.

In operation S504, the device 100 may display the operation screen of the first operating system on a first display region of the display 121 and may display an operation screen of the second operating system on a second display region of the display 121.

According to an exemplary embodiment, the device 100 may display the operation screen of the second operating system on the display 121 while the operation screen of the first operating system is being displayed on the display 121.

Figures 6A, 6B:
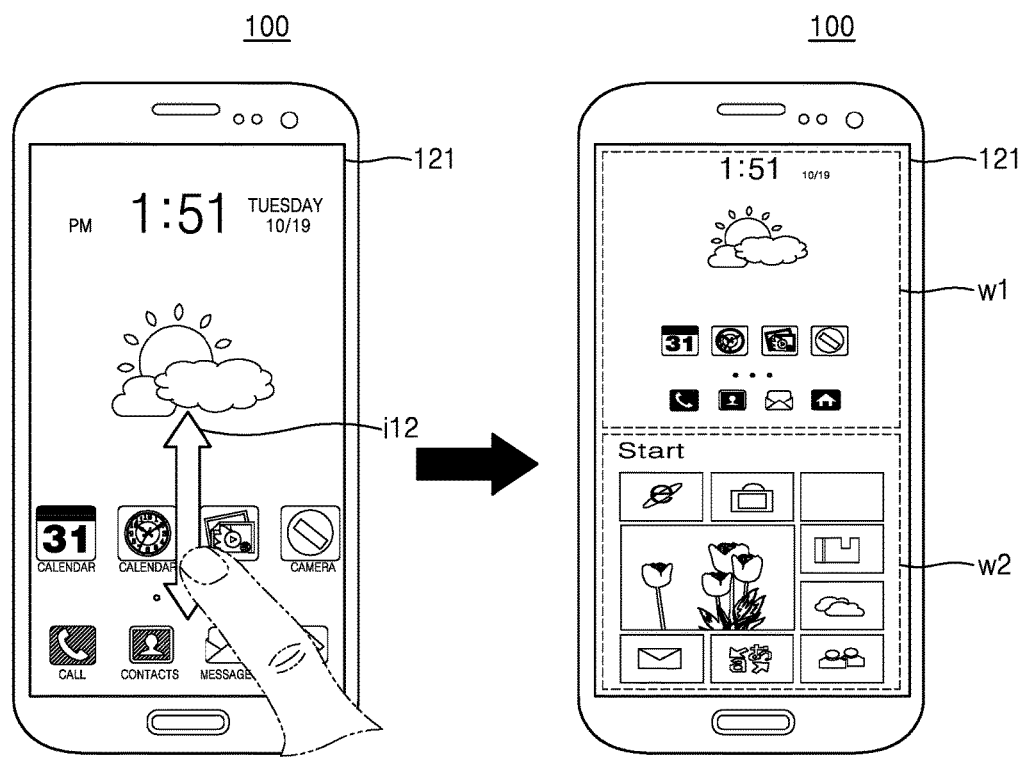
FIGS. 6A and 6B illustrate an example in which a plurality of screens are displayed.

FIGS. 6A and 6B illustrate an example in which a plurality of screens are displayed.

Referring to FIG. 6A, an operation screen of the first operating system (e.g., Android OS) is displayed. When the device 100 receives a predetermined interface (e.g., a sliding input i12 in a vertical direction), the device 100 may divide a display region of the display 121 into a first display region w1 and a second display region w2, as illustrated in FIG. 6B. The device 100 displays an operation screen of the first operating system (e.g., Android OS) on the first display region w1 and an operation screen of the second operating system (e.g., Windows) on the second display region w2.

The device 100 may simultaneously display operation screens of different operating systems on the display 121 by running the operating systems and providing a multi-window w1 and w2.

Figure 7B:
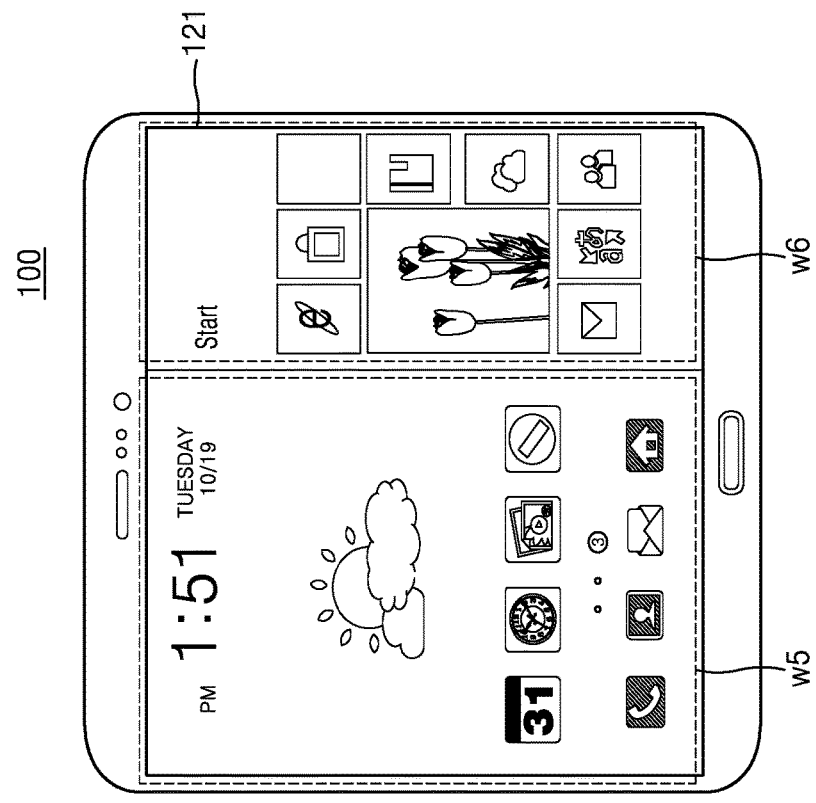
FIGS. 7A and 7B illustrate an example in which sizes of screens are adjusted.
Figure 7A:
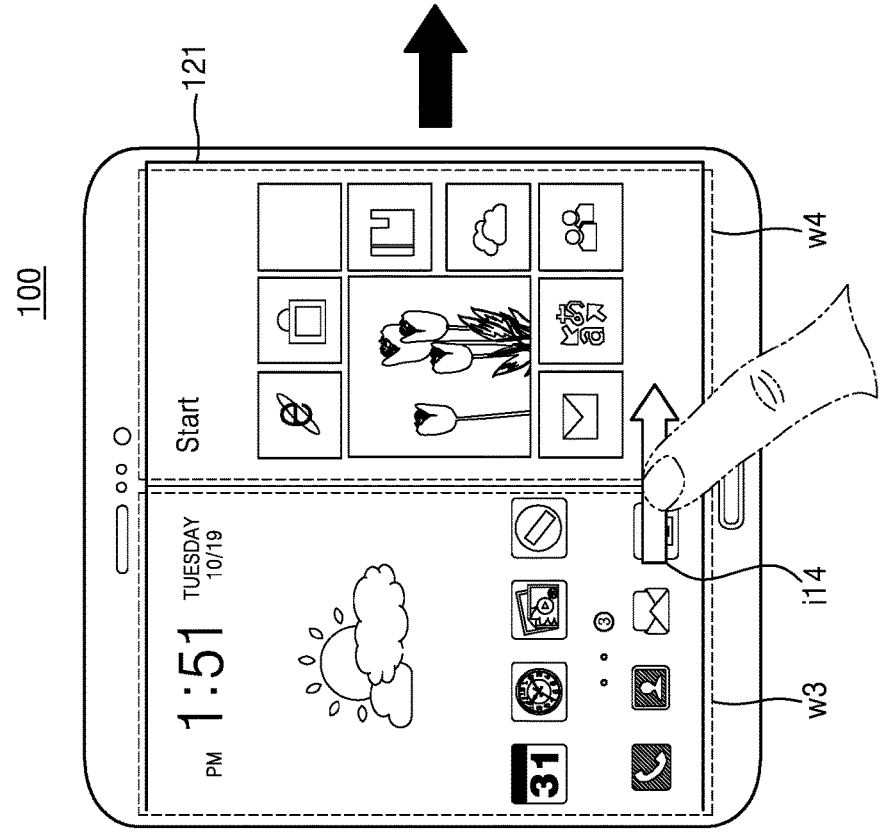

FIGS. 7A and 7B illustrate an example in which sizes of screens are adjusted.

Referring to FIG. 7A, the device 100 may display operation screens of operating systems on a first display region w3 and a second display region w4 of the display 121.

According to an exemplary embodiment, as illustrated in FIG. 7A, when the device 100 receives a drag input i14 of dragging a boundary between the first display region w3 and the second display region w4 rightward, the boundary between the first display region w3 and the second display region w4 may be moved rightward. Accordingly, as illustrated in FIG. 7B, a size of the first display region w3 may increase, that is, a first display region w5, and a size of the second display region w4 may decrease, that is, a second display region w6.

According to an exemplary embodiment, because a virtual machine for executing the second operating system may be run as an application program executed on the first operating system, the device 100 may move a location of the operation screen of the second operating system or adjust a size of the operation screen of the second operating system in accordance with the control of the KVM that is a Linux kernel module (refer to FIG. 3).

The controller 130 of the device 100 may adjust resolutions of the device 100 in accordance with sizes of the first and second display regions w5 and w6.

FIGS. 8A to 16B illustrate examples of interfaces for switching operating systems.

Figure 8A:
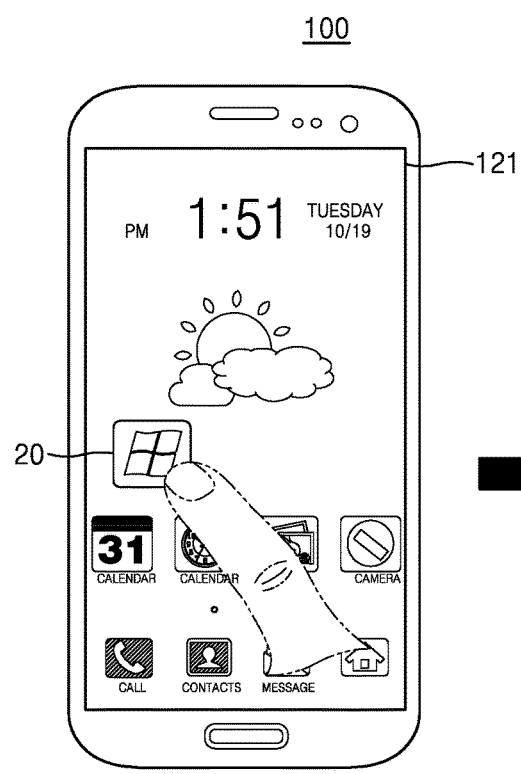
FIGS. 8A-8B illustrate examples of interfaces for switching operating systems.

As the device 100 receives a user input according to a predetermined interface, the device 100 may display an operation screen of a switched operating system on the display 121. FIG. 8A illustrates an example of an operation screen of the first operating system (e.g., Android OS), and FIG. 8B illustrates an example of an operation screen of the second operating system (e.g., Windows).

Figure 8B:
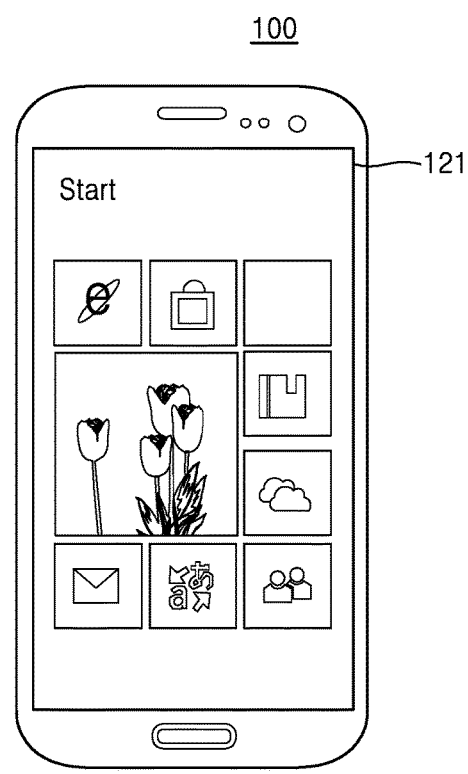

According to an exemplary embodiment, as illustrated in FIG. 8A, when the device 100 receives a user touch input of selecting a predetermined icon 20 displayed on the display 121, the device 100 switches the first operating system to the second operating system and displays an operation screen of the second operating system on the display 121, as illustrated in FIG. 8B.

Figures 9A, 9B:
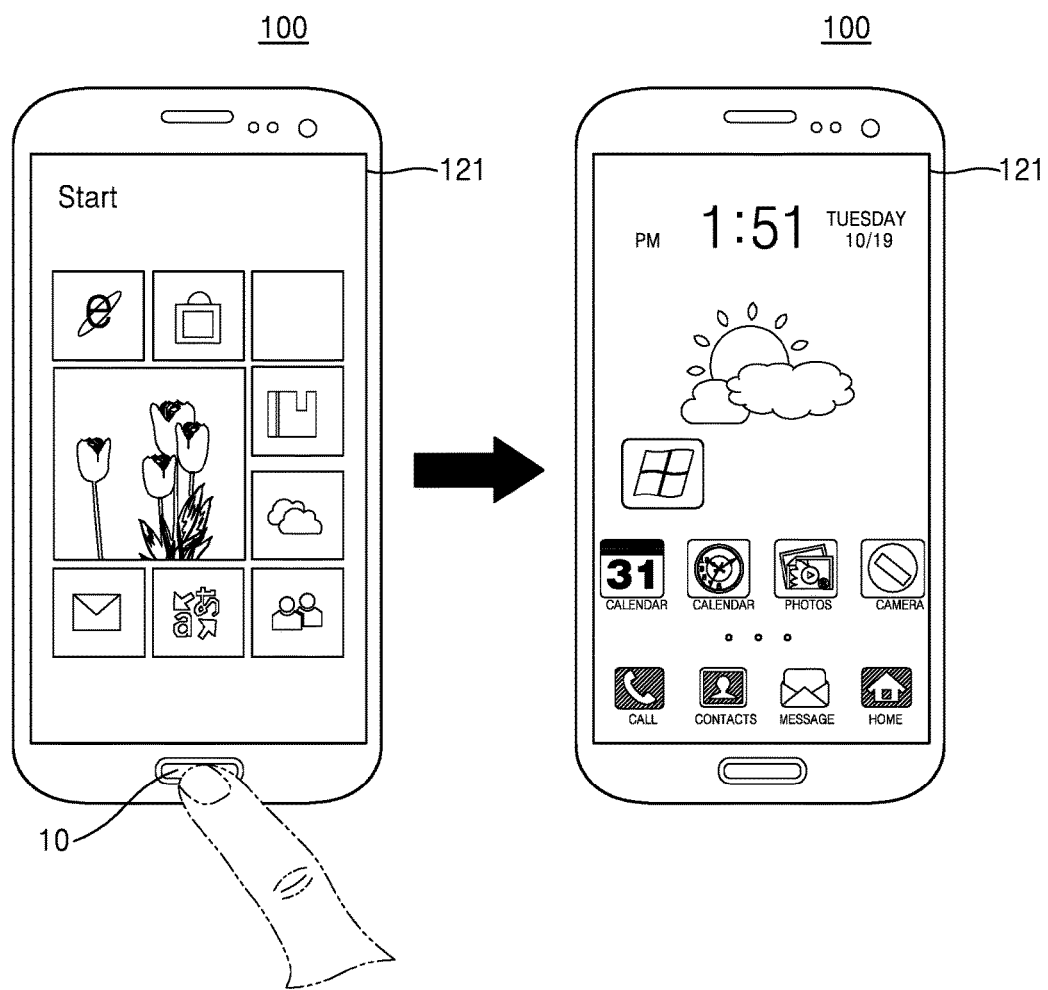
FIGS. 9A-9B illustrate examples of interfaces for switching operating systems.

Also, as illustrated in FIG. 9A, when a user input regarding a physical button 10 (e.g., a home button) positioned on the device 100 is received, the device 100 re-executes the first operating system and may display an operation screen of the first operating system on the display 121, as illustrated in FIG. 9B.

Figures 1, 10A:
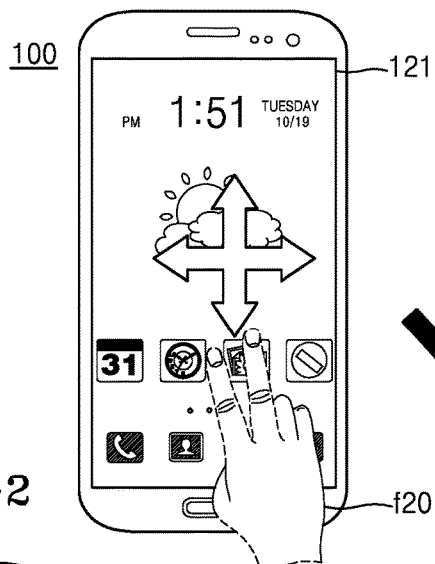
Figures 2, 10A:
Figures 3, 10A:
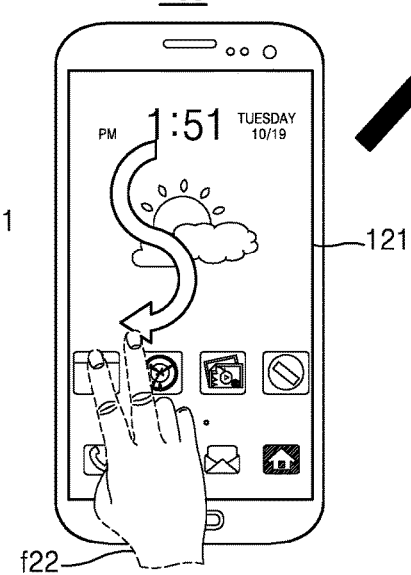
Figure 10B:
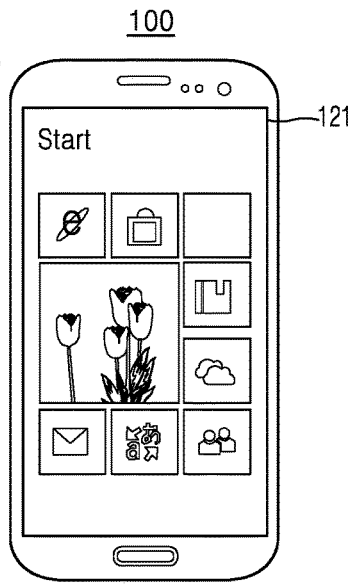

As another example, referring to FIGS. 10A-1 to 10B, an interface for switching operating systems may be a combination of touch inputs with regard to the display 121.

For example, as illustrated in FIG. 10A-1, as the device 100 receives a touch input of sliding two fingers f20 of the user in a certain direction (e.g., a vertical or horizontal direction), the device 100 may switch operating systems.

Also, as illustrated in FIG. 10A-2, as the device 100 receives a tap input of tapping the display 121 with two fingers f21, the device 100 may switch operating systems.

Also, as illustrated in FIG. 10A-3, as the device 100 receives a touch input of drawing a predetermined alphabet letter (e.g., 'S') on the display 121, the device 100 may switch operating systems.

Figures 1, 11A:
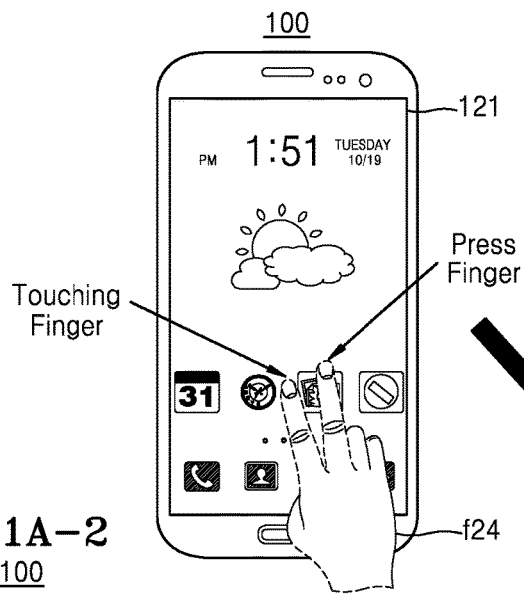
Figures 2, 11A:
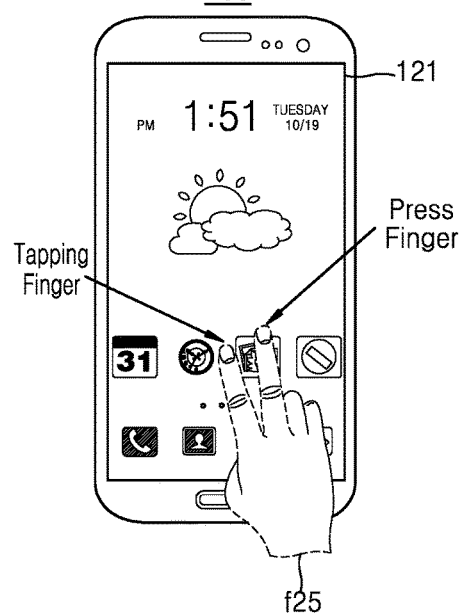
Figures 3, 11A:
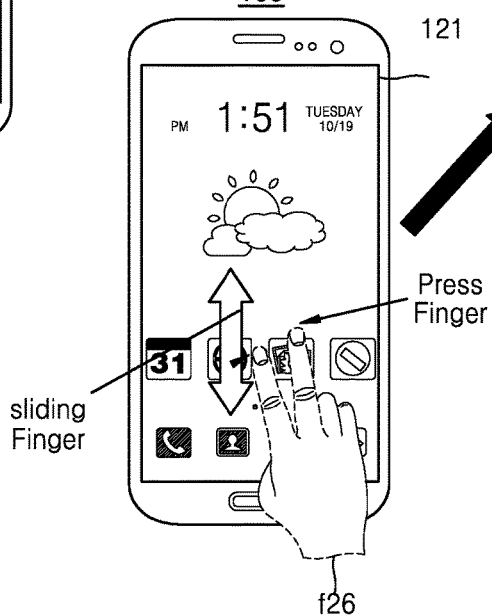
Figure 11B:
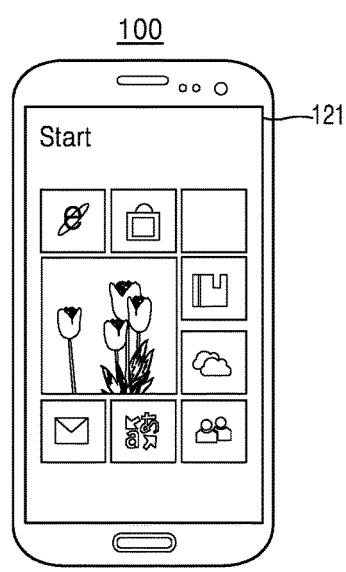

Also, as illustrated in FIG. 11A-1, the device 100 may set a touch input, in which a finger keeps touching the display 121 and another finger touches the display 121, as an interface for switching operating systems. For example, when the display 121 receives an input of touching the display 121 with an index finger while a middle finger maintains contact with the display 121, the device may switch operating systems.

Also, as illustrated in FIG. 11A-2, the device 100 may set a tap input of tapping the display 121 with a finger while another finger maintains contact with the display 121, as an interface for switching operating systems. For example, when the display 121 receives the tap input of tapping the display 121 with an index finger while a middle finger maintains contact with the display 121, the device 100 may switch operating systems.

Also, as illustrated in FIG. 11A-3, the device 100 may set, as an interface for switching operating systems, a sliding input of sliding a finger over the display 121 while another finger maintains contact with the display 121. For example, when the display 121 receives an input of sliding an index finger over the display 121 in a vertical direction while a middle finger of the user keeps touching maintains contact with the display 121, the device 100 may switch operating systems.

Figures 1, 12A:
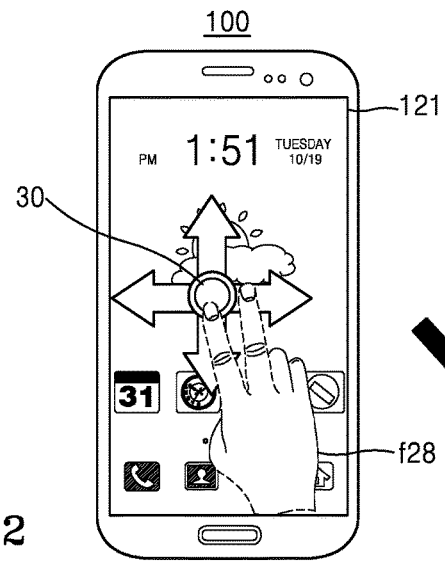
Figures 2, 12A:
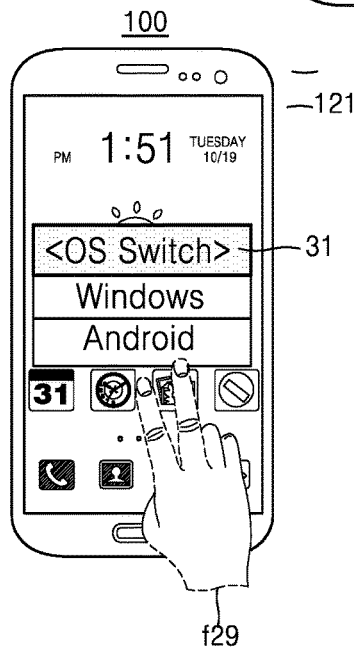
Figures 3, 12A:
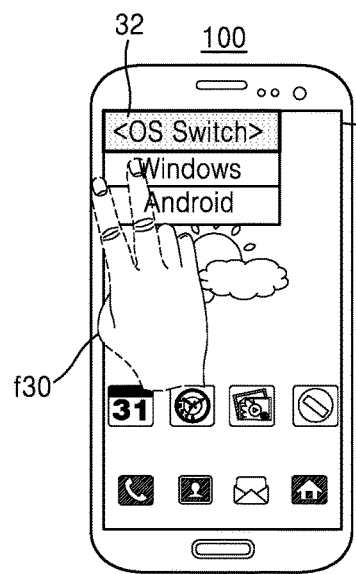
Figure 12B:
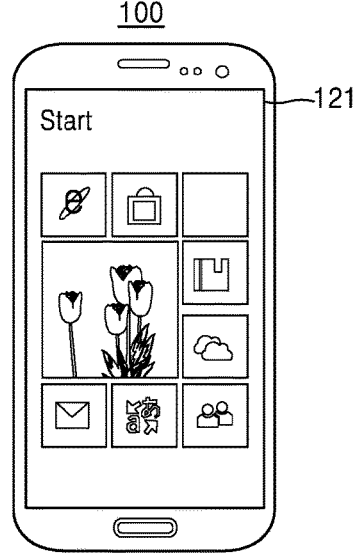

Also, as illustrated in FIG. 12A-1, when the device 100 receives an input of long-pressing the display 121 with fingers f28 of the user, the device 100 may generate a predetermined icon 30 on the display 121 and may set an input of sliding the fingers f28 across the display 121 in a vertical or horizontal direction from the generated icon 30 as an interface for switching operating systems.

Also, after the icon 30 is generated, the device 100 may set a touch input having various combinations as an interface for switching operating systems.

Referring to FIG. 12A-2, for example, when the device 100 receives the input of long-pressing the display 121 with two fingers f29, the device 100 may display, on the display 121, a menu window 31 including names of operating systems capable of being switched. According to an exemplary embodiment, as the device 100 receives an input of selecting a name of a desired operating system on the menu window 31 displayed on the display 121, the device 100 may switch operating systems.

Also, referring to FIG. 12A-3, when the device 100 receives an input of touching a certain portion of the display 121 with two fingers f30, the device 100 may display, on the display 121, a menu window 32 including names of operating systems capable of being switched. Also, the device 100 may generate and display a predetermined icon.

According to an exemplary embodiment, as the device 100 receives the input of selecting a name of a desired operating system on the menu window 32 displayed on the display 121, the device 100 may switch operating systems.

Referring to FIG. 13A, as the device 100 receives an input of pressing a menu button 33 provided to the display 121, the device 100 may display, on the display 121, a thumbnail images 34 showing types of operating systems. The device 100 may switch operating systems as the device 100 receives an input of selecting one of the thumbnail images 34.

Also, referring to FIG. 13B, the device may display a menu bar 35 on a side of the display 121 and may display a selection menu or icons 36 for switching operating systems on the menu bar 35. As the device 100 receives an input of selecting the icons 36 for switching operating systems, the device 100 may switch operating systems.

Figures 14A, 14B:
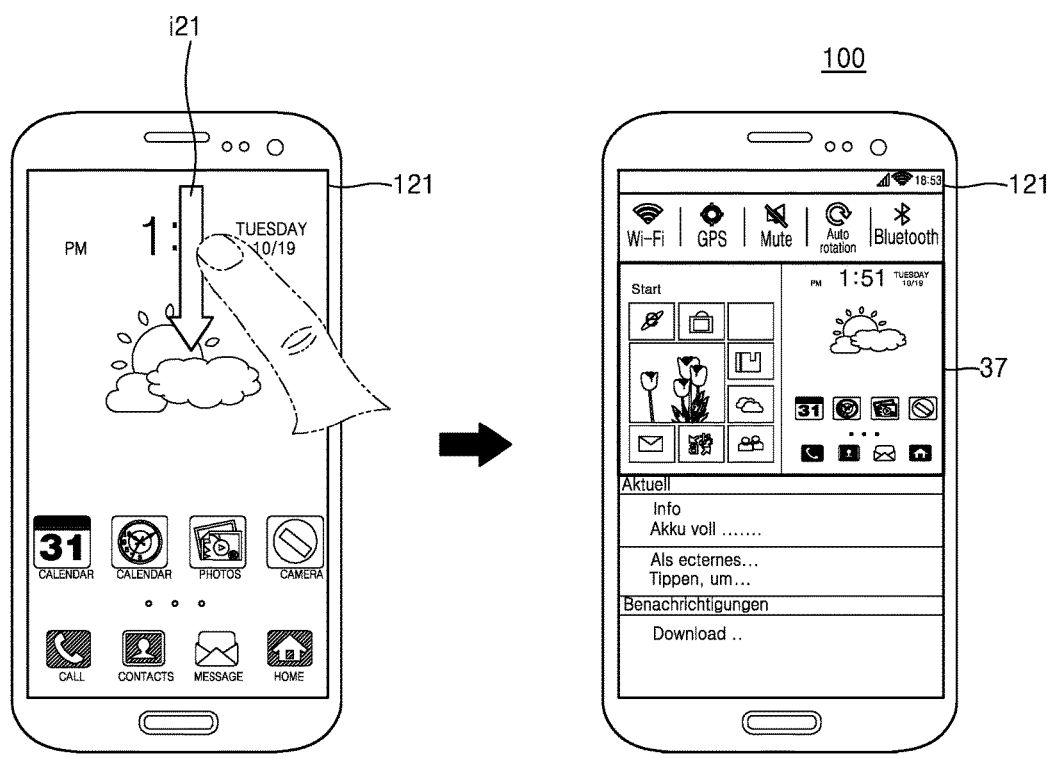
FIGS. 14A-14B illustrate examples of interfaces for switching operating systems.

Referring to FIG. 14A, when the device 100 receives an input i21 of dragging the display 121 downwardly from an upper edge portion, the device 100 may display a screen including a setting menu on the display 121.

As illustrated in FIG. 14B, the screen including the setting menu is a selection menu for switching operating systems and may include thumbnail images 37 showing types of operating systems. The device 100 may switch operating systems as the device 100 receives an input of selecting one of the thumbnail images 37.

Figure 15A:
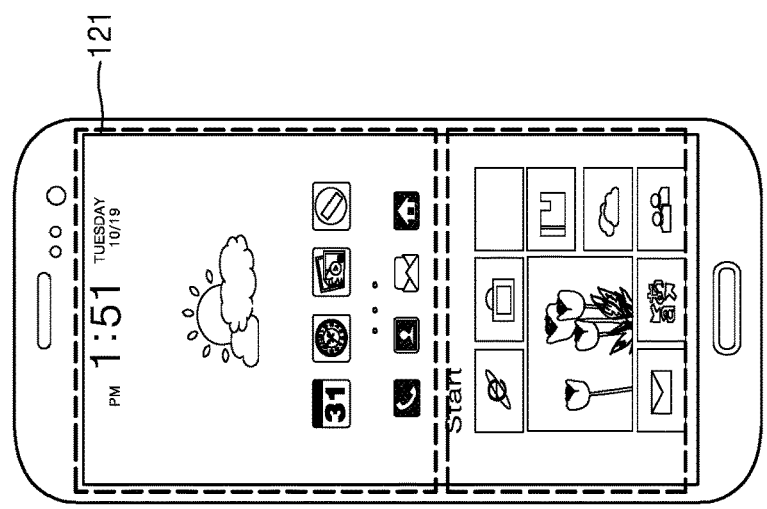
FIGS. 15A-15C illustrate examples of interfaces for switching operating systems.

As illustrated in FIG. 15A, the device 100 may receive an input of drawing a rectangle line on a region of the display 121, which a user desires to draw, by using a stylus pen 38 configured to transmit an input signal to a touch screen and for long-touching the display 121.

Figure 15B:
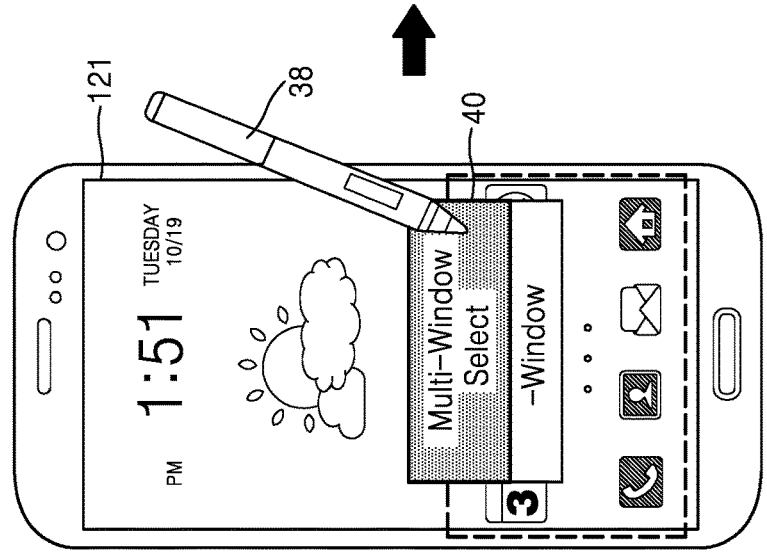
Figure 15C:
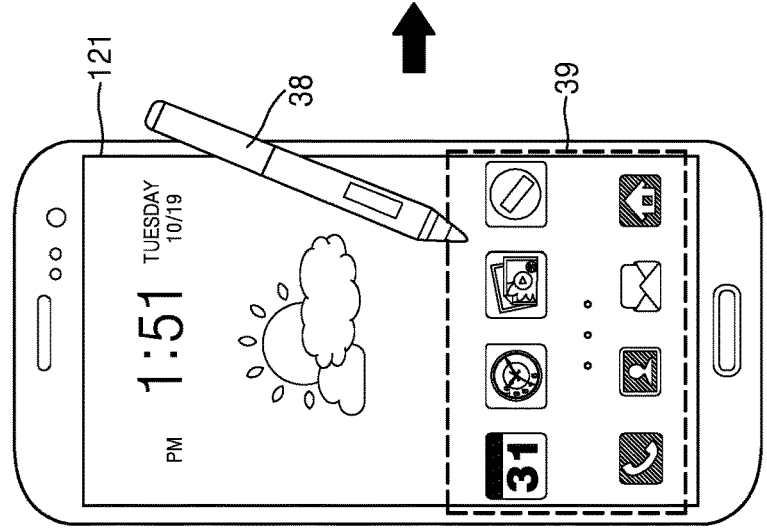

As illustrated in FIG. 15B, the device may display, on the display 121, a menu window 40 for selecting an operating system to be switched.

When the device 100 receives an input of selecting a certain operating system displayed on the menu window 40, the device 100 may display an operation screen of the second operating system (e.g., Windows) within a rectangular region 39.

FIGS. 16A and 16B illustrate examples of switching operating systems via voice recognition.

As a user's voice is recognized, the device 100 may switch an operating system to be activated.

According to an exemplary embodiment, the device 100 may store a voice message of the user for performing a certain command in advance. For example, in response to a voice command of the user, that is, "switch to Windows", as illustrated in FIG. 16A, the device 100 may activate the second operating system (e.g., Windows) and may display the operation screen of the second operating system on the display 121, as illustrated in FIG. 16B.

FIGS. 17 to 20 illustrate examples of setting menus related to running of a plurality of operating systems.

Figure 17:
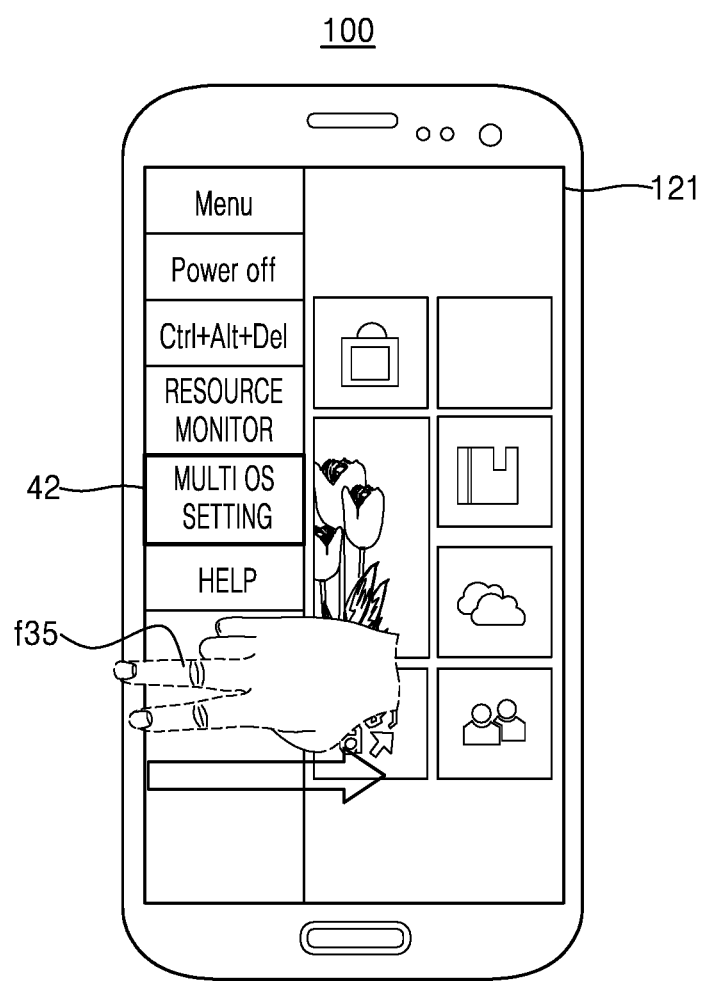
FIG. 17 illustrates an example of setting menus related to running of a plurality of operating systems.
Figure 18:
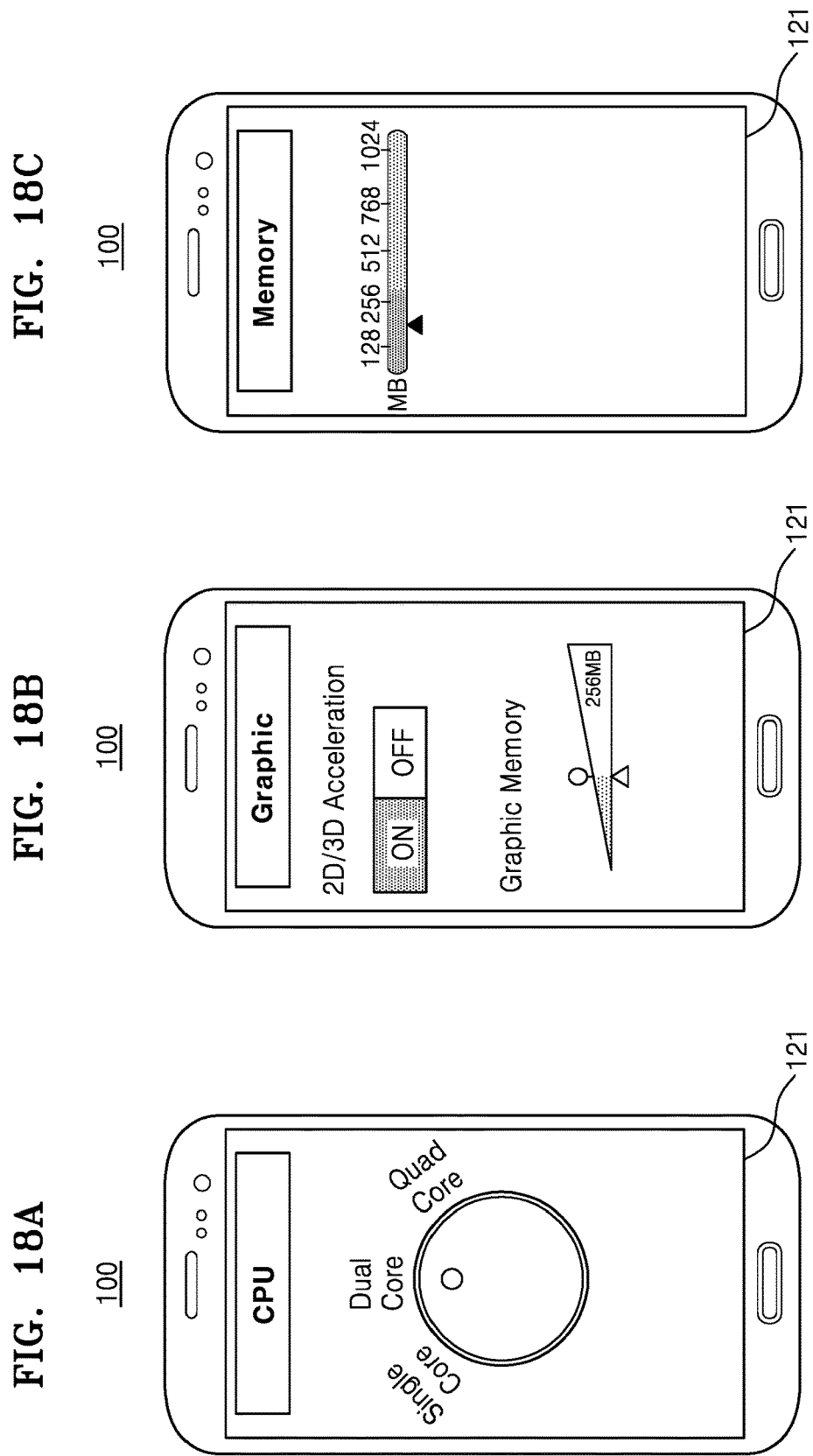
FIGS. 18A-18C illustrate examples of setting menus related to running of a plurality of operating systems
Figure 19:
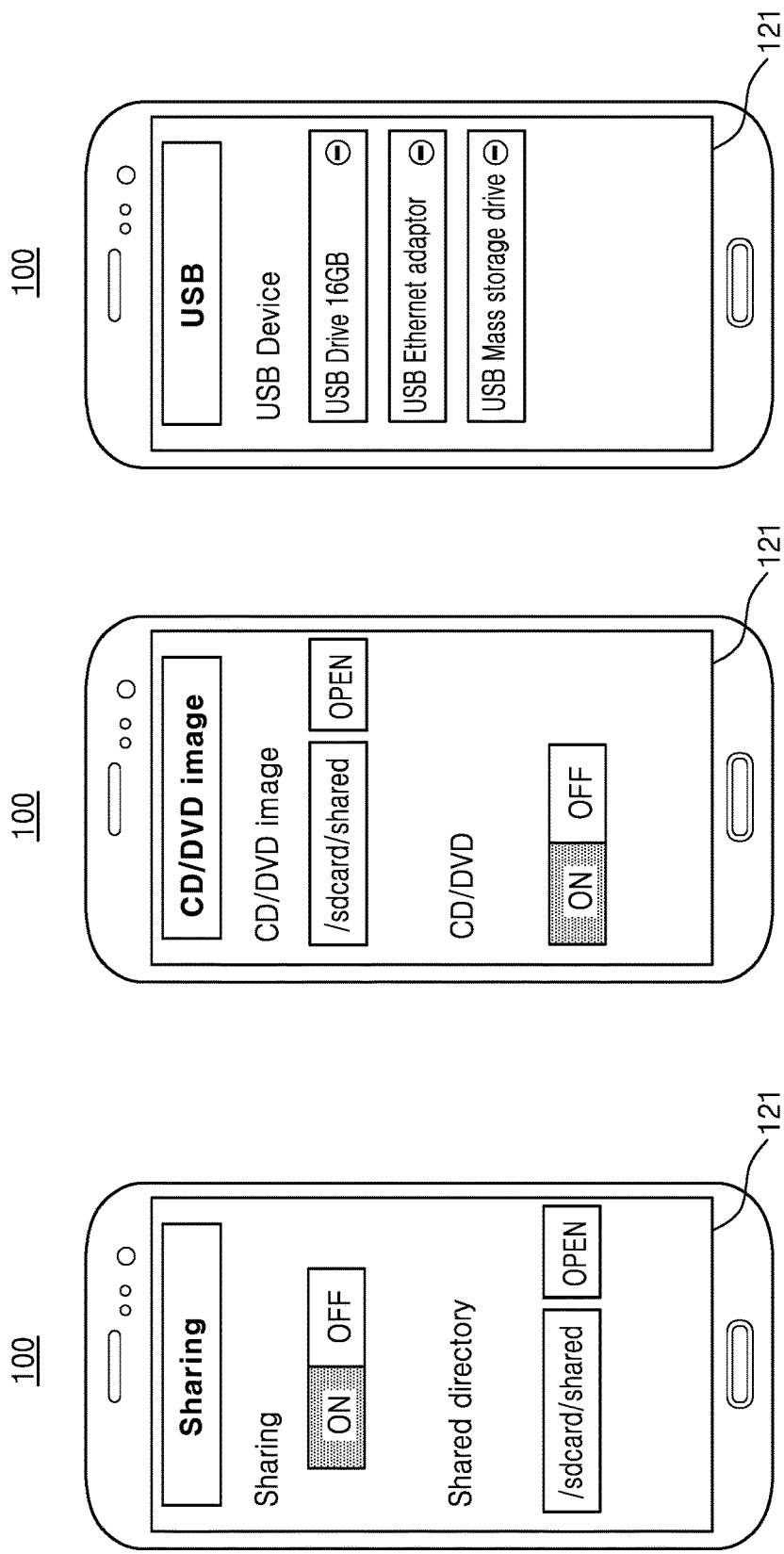
FIGS. 19A-19C illustrate examples of setting menus related to running of a plurality of operating systems

As illustrated in FIG. 17, as the device 100 receives an input of dragging an edge portion of the display 121 with two fingers f35 in a horizontal direction, the device 100 may display a setting-related menu 42 of a guest operating system.

Referring to FIGS. 18A to 18C, a central processing unit (CPU), a graphics processing unit (GPU), and assignment of a memory may be set or changed as a setting menu of the guest operating system.

Also, referring to FIGS. 19A to 19C, a path of a shared folder of the guest operating system, CD/DVD-related setting, and a USB-related items may be set or changed.

Figure 20:
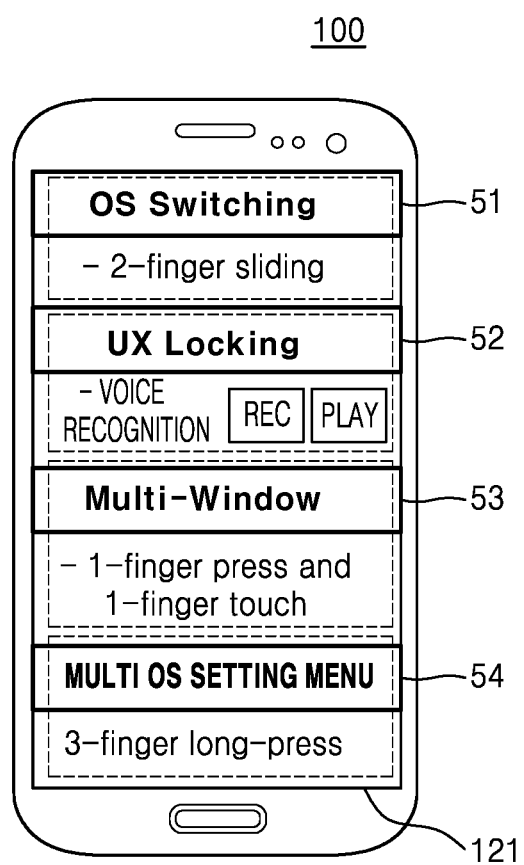
FIG. 20 illustrates an example of setting menus related to running of a plurality of operating systems.

FIG. 20 illustrates an example of setting a user interface that is set for various purposes such as switching operating systems.

According to an exemplary embodiment, an input of sliding two fingers over the display 121 may be set as an interface 51 for switching operating systems.

Also, voice recognition may be set as an interface 52 for locking a host operating system. The user may record or play a desired voice command in advance in order to set the voice recognition.

Also, an input of touching the display 121 with a finger while the display 121 remains touched with another finger (1-finger press and 1-finger touch) may be set as an interface 53 for displaying the display 121 as a multi-window.

Also, a touch input of pressing the display 121 with three fingers for a long time (3-finger long-press) may be set as an interface 54 for entering a setting menu of a multi-operating system.

Figure 21:
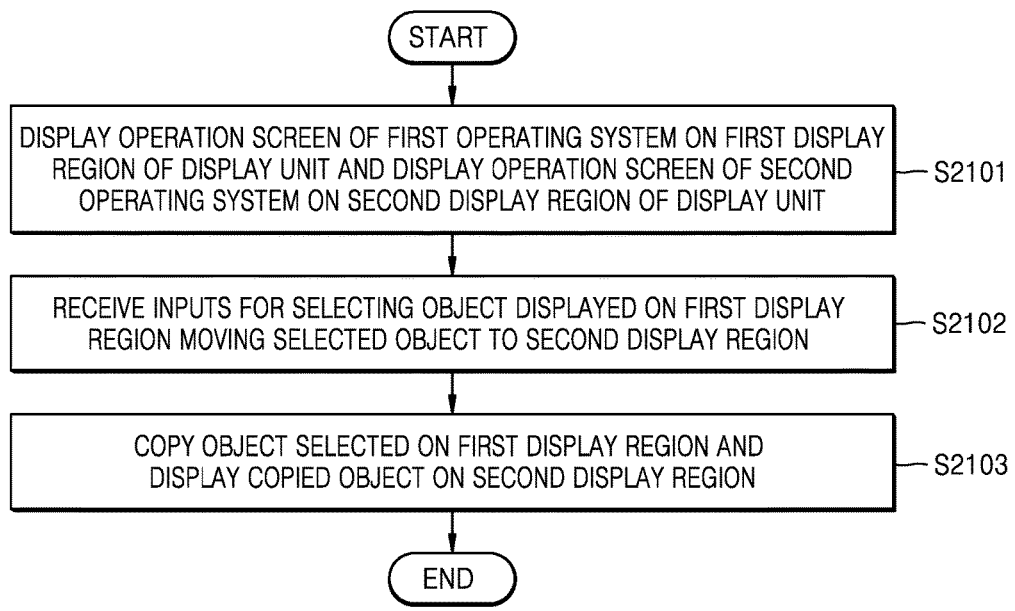
FIG. 21 illustrates a flowchart of a method of running multiple operating systems according to an exemplary embodiment.

FIG. 21 illustrates a flowchart of a method of running multiple operating systems according to an exemplary embodiment.

In operation S2101 of FIG. 21, the device 100 may display an operation screen of a first operating system on a first display region of the display 121 and an operation screen of a second operating system on a second display region of the display 121. According to an exemplary embodiment, the device 100 provides a multi-window and may simultaneously display operations of operating systems.

In operation S2102 of FIG. 21, the device may receive a user input of selecting an object displayed the first display region and moving the selected object to the second display region.

In operation S2103, the device 100 may copy the object selected on the first display region and may display the copied object on the second display region.

According to an exemplary embodiment, the device 100 copies predetermined content corresponding to the object and may store the copied object in a memory area controlled by an operating system corresponding to the second display region.

In some exemplary embodiments, an object may be similarly copied from the second display region to the first display region using a similar process.

Figure 23:
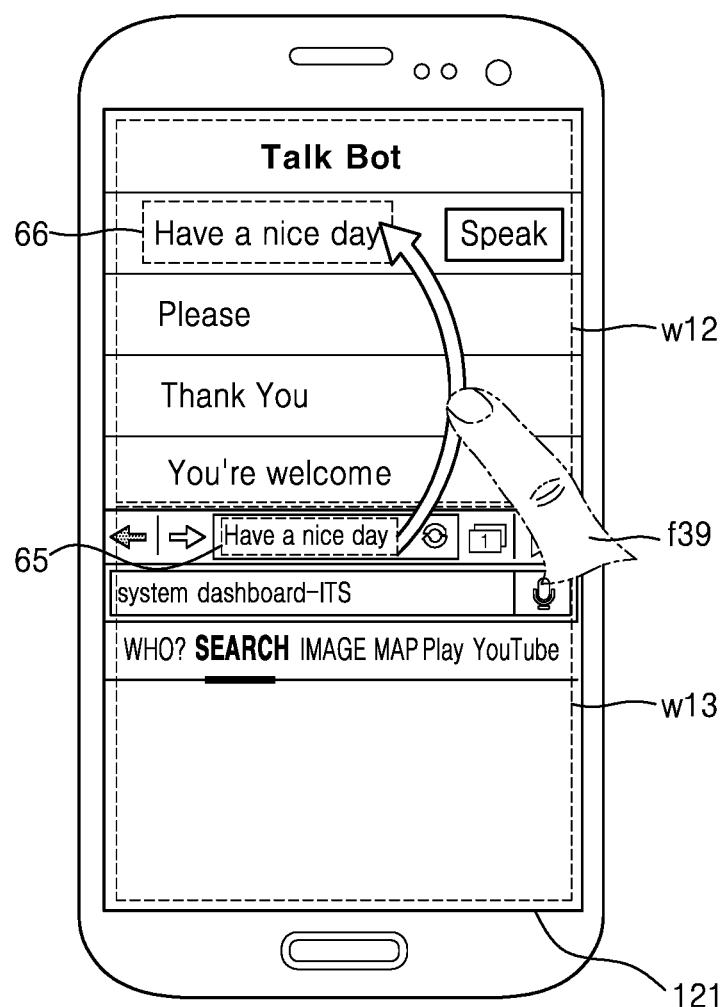

FIGS. 22A to 23 illustrate other exemplary embodiments.

Referring to FIGS. 22A and 22B, an operation screen of a first operating system is displayed on a first display region w8, and an operation screen of a second operating system is displayed on a second display region w9.

Referring to FIG. 22A, the device 100 executes, on the first display region w8, a file browser controlled by the first operating system and may execute, on the second display region w9, a file browser controlled by the second operating system.

The device 100 may receive a drag and drop input f37 for selecting a file icon 61 displayed on the second display region w9 and moving the file icon 61 to the first display region w8. The device 100 copies the file icon 61 and may display a file icon 62 on the first display region w8.

In this case, the device 100 copies a file corresponding to the file icon 61 and may move and store the copied file icon 61 in a memory area controlled by the first operating system.

Also, as illustrated in FIG. 22B, the device 100 displays on a first display region w10 a main screen according to the operation of the first operating system and may execute on a second display region w11 a file browser controlled by the second operating system.

The device 100 may receive a drag and drop input f38 for selecting a file icon 63 displayed on the second display region w11 and moving the selected file icon 63 to the first display region w10. The device 100 copies the file icon 63 and may display a file icon 64 on the first display region w10.

In this case, the device 100 copies a file corresponding to the file icon 63 and may move and store the copied file in a memory area controlled by the first operating system and having a predetermined path for sharing files.

When the file icons 61 and 63 displayed on the second display regions w9 and w11 are copied and displayed on the first display regions w8 and w10, the device 100 may copy the file icons 61 and 63 in the same shapes, forms, etc as each other and display the same.

Also, the device may change the shapes, forms, etc. of the file icons 61 and 63 in accordance with shapes, forms, etc. of icons according to a user interface provided by the first operating system that is run on the first display regions w8 and w10 and may display the changed shapes, forms, etc. of the file icons 61 and 63.

Also, FIG. 23 illustrates an example in which an operation screen of a first operating system is displayed on a first display region w12 and an operation screen of a second operating system is displayed on a second display region w13.

According to an exemplary embodiment, the device 100 may receive a drag and drop input of selecting a predetermined text 65 (e.g., 'Have a nice day') displayed on the second display region w13 and moving the predetermined text 65 to the first display region w12.

The device 100 may copy the selected text 65 and display the copied text 66 on a text input window shown on the first display region w12.

Figure 24:
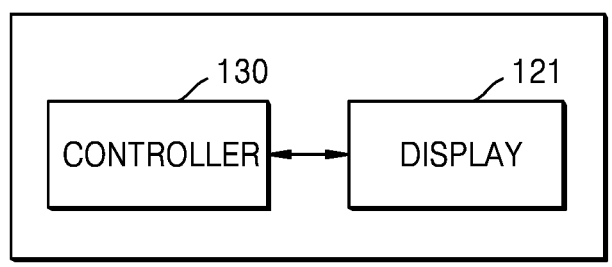
FIGS. 24 and 25 illustrate block diagrams of a device related to the one exemplary embodiment.
Figure 25:
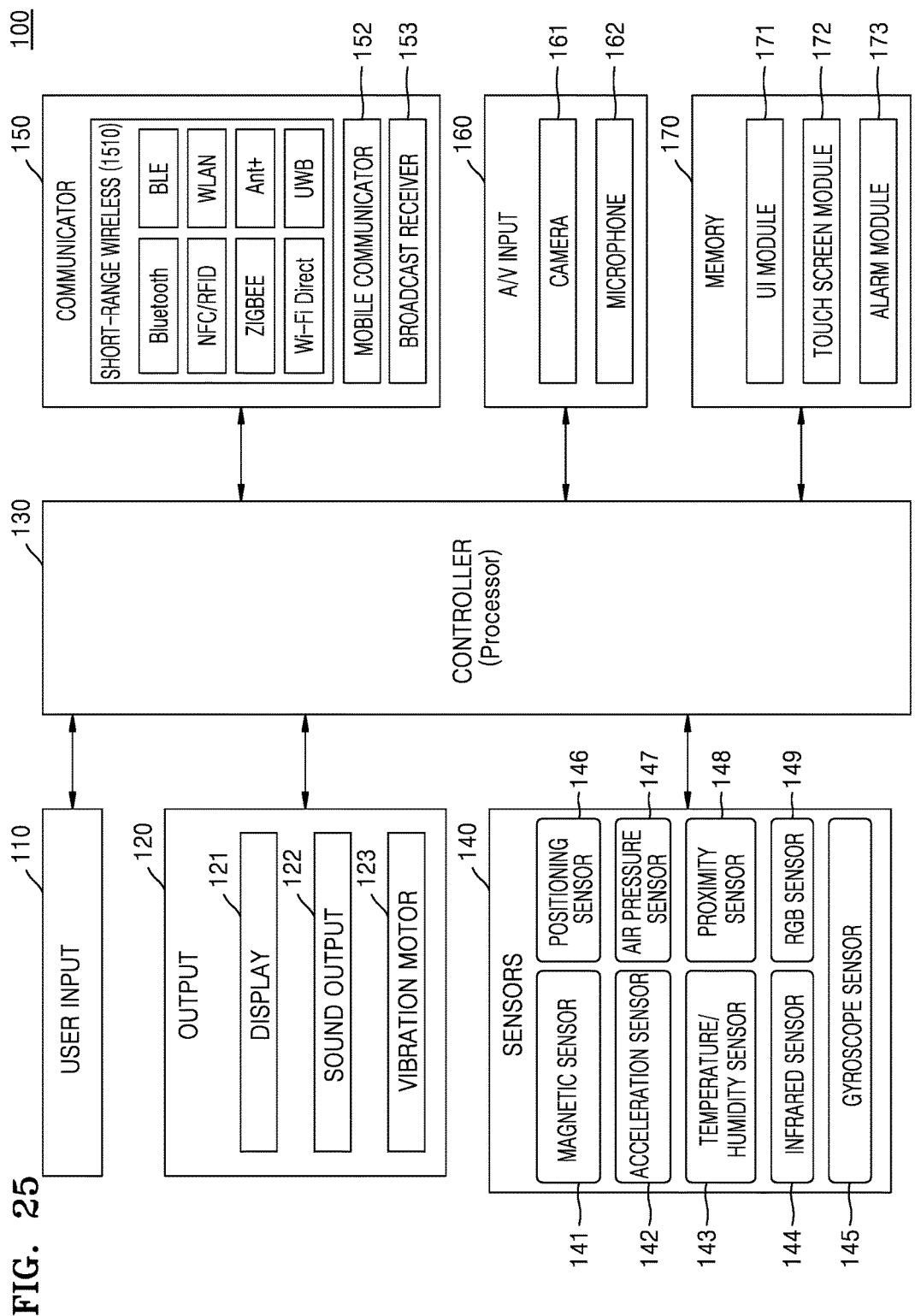

FIGS. 24 and 25 illustrate block diagrams of a device related to the one exemplary embodiment.

As illustrated in FIG. 24, the device 100 may include a controller 130 and a display 121. However, not every component is necessary. The device 100 may include more or less components than illustrated in FIG. 24.

For example, as illustrated in FIG. 25, the device according to an exemplary embodiment may further include a user input 110, an output 120, sensors 140, a communicator 150, an Audio/Video (A/V) input 160, and a memory 170 in addition to the display 121 and the controller 130.

Hereinafter, the aforementioned components will be described in detail.

The user input 110 is used by the user to input data for controlling the device 100. For example, the user input 110 may include a key pad, a dome switch, a touch pad, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but exemplary embodiments are not limited thereto.

The user input 110 is controlled by the controller 130 and may receive user inputs.

The output 120 is controlled by the controller 130 and outputs an audio signal, a video signal, or a vibration signal. The output 120 may include the display 121, a sound output 122, and a vibration motor 123.

The display 121 is controlled by the controller 130 and displays information processed by the device 100.

When a touch screen is formed to have a layer structure including the display 121 and a touch pad, the display 121 may be used as an input device as well as an output device. The display 121 may include at least one of a liquid crystal display (LCD), a thin film transistor-liquid crystal display (TFT-LCD), an organic light-emitting diode (OLED), a flexible display, a three-dimensional (3D) display, and an electrophoretic display. According to an implementation type of the device 100, the device 100 may include at least two displays 121. In this case, the at least two displays 121 may be arranged to face each other by using a hinge.

The display 121 may display an operation screen of an operating system corresponding to an activated operating system.

Also, the display 121 may provide a multi-window by dividing a display region into a plurality of display regions.

Also, the display 121 displays an operation screen of a first operating system on a display region of the display 121 and an operation screen of a second operating system on a second display region of the display 121.

A sound output 122 outputs audio data received from the communicator 150 or stored in the memory 170. Also, the sound output 122 may audio signals (e.g., a call signal receiving sound, a message receiving sound, or the like) related to functions performed by the device 100. The sound output 122 may include a speaker, a buzzer, or the like.

The vibration motor 123 may output a vibration signal. For example, the vibration motor 123 may output the vibration signal that corresponds to an output of the audio data (e.g., the call signal receiving sound, the message receiving sound, or the like) or video data. Also, when a touch is input to the touch screen, the vibration motor 123 may output a vibration signal.

The controller 130 may generally control all operations of the device 100. For example, the controller 130 may control the user input 110, the output 120, the sensors 1440, the communicator 150, the A/V input 160, or the like by executing programs stored in the memory 170.

In more detail, the controller 130 of the device 100 may display the operation screen of the first operating system on the display 121 by activating the first operating system.

Also, when the controller 130 receives a user input according to a predetermined interface for switching the first operating system to the second operating system, the controller 130 may display the operation screen of the second operating system on the display 121.

Also, when the controller 130 receives a user input according to a predetermined interface for switching the first operating system to the second operating system, the controller 130 may divide the display region of the display 121 into the plurality of display regions. The controller 130 displays the operation screen of the first operating system on the first display region of the display 121 and the operation screen of the second operating system on the second display region of the display 121.

Also, the controller 130 may increase or decrease a size of the first display region or a size of the second display region in accordance with a predetermined input signal.

Also, as the controller 130 receives user inputs of selecting an object displayed on a first region that is one of the first display region and the second display region and moving the selected object to a second region different from the first region from among the first display region and the second display region, the controller 130 may copy the object selected on the first region and may display the copied object on the second region.

Also, the controller 130 may copy content corresponding to the object selected on the first region and may store the copied content in the memory area controlled by an operating system corresponding to the second region.

Also, the controller 130 may set an interface for switching the first operating system to the second operating system from among interfaces for operating systems in accordance with selection inputs of the user.

Also, as the controller 130 receives a predetermined user input of switching the first operating system to the second operating system, the controller 130 may switch a state of the first operation system to an inactive state and a state of the second operating system to an active state.

When a predetermined input event occurs, the controller 130 may set a signal according to the input event not to be transmitted to the first operating system.

The sensors 140 may detect a state of the device 100 or a state around the device 100 and may transmit detected information to the controller 130. The sensors 140 may include at least one from among a magnetic sensor 141, an acceleration sensor 142, a temperature/humidity sensor 143, a infrared sensor 144, a gyroscope sensor 145, a position sensor (e.g., GPS) 146, an air pressure sensor 147, a proximity sensor 148, and a RGB sensor (an illuminance sensor) 149, but is not limited thereto. Functions of each sensor may be intuitively inferred by one of ordinary skill in the art, and thus, detailed descriptions thereof will be omitted.

Also, the sensors 140 may include a sensor for detecting a touch input by an input tool and a sensor for detecting a touch input of the user. In this case, the sensor for detecting a touch input of the user may be included in a touch screen or a touch pad. Also, the sensor for detecting a touch input by an input tool may be disposed under the touch screen or touch pad or may be included therein.

The communicator 150 may include one or more components that enable communication of the device 100 with an external terminal or with an external server. For example, the communicator 150 may include a short-range wireless communicator 151, a mobile communicator 152, and a broadcasting receiver 153.

The short-range wireless communicator 151 may include, but is not limited to, a Bluetooth communicator, a Bluetooth Low Energy (BLE) communicator, a Near Field Communication (NFC) unit, a WLAN (Wi-Fi) communicator, a Zig-Bee communicator, an infrared Data Association (IrDA) communicator, a Wi-Fi Direct (WFD) communicator, a ultra wideband (UWB) communicator, an Ant+ communicator, or the like.

The mobile communicator 152 receives/transmits a mobile signal to or from at least one of a base station, an external terminal, and a server via a mobile communication network. The mobile signal may include various types of data according to reception or transmission of a voice call signal, a video phone call signal, or a text or multimedia message.

The broadcasting receiver 153 receives information related to a broadcasting signal or broadcasting from an external terminal via a broadcasting channel. The broadcasting channel may include a satellite channel and a ground waves channel. According to an exemplary embodiment, the device may not include the broadcasting receiver 153.

The A/V input 160 inputs an audio signal or a video signal and may include a camera 161, a microphone 162, and the like. The camera 161 may obtain an image frame such as a static image or a moving image in a video call mode or shooting mode, via an image sensor. An image captured by the image sensor may be processed by the controller 130 or a separate image processor.

An image frame processed by the camera 161 may be stored in the memory 170 or transmitted to the outside via the communicator 150. According to structures of a device, there may be at least two cameras 161.

The microphone 162 receives an external sound signal and processes the received sound signal as an electrical voice data. For example, the microphone 162 may receive a sound signal from an external device or a speaker. The microphone 162 may use various noise removal algorithms for removing noise generated during the reception of the external sound signal.

The memory 170 may store programs for processing and controlling the controller 130 and may store input/output data.

The memory 170 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disc, and an optical disc.

Also, the device 100 may drive a web storage or a cloud server that performs a storing function of the memory 170 on the Internet.

Programs stored in the memory 170 may be classified into a plurality of modules according to their functions, for example, into a UI module 171, a touch screen module 172, a notification module 173, etc.

The UI module 171 may provide a specialized UI or GUI which interoperates with the device 100 according to applications. The touch screen module 172 may detect a user's touch gesture on the touch screen and may transmit information related to the touch gesture to the controller 130. The touch screen module 172 may identify and analyze touch codes. The touch screen module 172 may be configured as a separate hardware including a controller.

Various sensors may be arranged in or near the touch screen so as to detect a touch or a proximate touch on the touch screen. An example of the sensor to detect the touch on the touch screen may be a tactile sensor. The tactile sensor detects a contact of a specific object at least as much as a person can detect. The tactile sensor is a sensor for detecting contact of a certain object by at least as much as a person can detect. The tactile sensor may detect various types of information such as the roughness of a contact surface, the hardness of a contact object, the temperature of a contact point, or the like.

An example of the sensor for detecting a touch on the touch screen is a proximity sensor. The proximity sensor detects the existence of an object approaching a predetermined detection surface or a neighboring object by using power of an electromagnetic field or infrared rays without a mechanical contact. Examples of the proximity sensor may be a transmitting photoelectric sensor, a direct reflective photoelectric sensor, a mirror-reflective photoelectric sensor, a high-frequency oscillation photoelectric sensor, a capacitive proximity sensor, a magnetic proximity sensor, an infrared-ray proximity sensor, or the like. A touch gesture of the user may include a tap gesture, a touch & hold gesture, a double tap gesture, a drag gesture, a panning gesture, a flick gesture, a drag & drop gesture, a swipe gesture, or the like.

The notification module 173 may generate a signal for notifying the occurrence of events in the device 100. Examples of the event occurring in the device 100 may be call signal reception, message reception, a key signal input, a schedule notification, etc. The notification module 173 may output a notification signal in a video signal form via the display 121, in an audio signal form via the sound output 122, or in a vibration signal form via the vibration motor 123.

The above one or more exemplary embodiments are merely examples, and are not limited thereto. Also, the method of running the operating systems is not limited to the orders described with reference to the flowcharts of FIGS. 2, 5, and 21. According to one or more exemplary embodiments, some operations may be omitted or added, and a specific process order may be performed differently from the described order.

Each of the above one or more exemplary embodiments described throughout the specification may be applied to other exemplary embodiments, and these exemplary embodiments may be partially implemented or may be implemented by using a combination of the one or more exemplary embodiments.

Some exemplary embodiments may be implemented as a recording medium including commands executable by a computer. An example of the command may be a program module executed by a computer. The computer-readable recording medium may be an arbitrary medium that can be accessed by a computer and may include volatile and non-volatile media and removable and non-removable media. Also, the computer-readable recording medium may include a computer storage medium and a communication medium. The computer storage medium may include volatile, non-volatile, removable, and non-removable media implemented by an arbitrary method or technology for storing information such as a computer-readable command, a data structure, a program module, or data. The communication medium generally includes other data of a modulated data signal such as a computer-readable command, a data structure, a program module, or other transmission mechanism and may also include an arbitrary information transmission medium.

Also, the term " . . . unit" may be a hardware component such as a processor a circuit, and/or a software component executed by the hardware component such as a processor.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A device configured to execute a plurality of operating systems, the device comprising:
   a display; and
   a processor configured to:
   control the display to display an operation screen of a first operating system when the first operating system is activated;

based on receiving a first user input tracing an outline on the display, control to activate a second operating system;

control the display to display the operation screen of the first operating system on a first display region of the display and to display the operation screen of the second operating system on a second display region of the display, the second display region being defined by a size of the outline and a location of the outline; and based on receiving a second user input, control the display to change at least one of a size of the second display region and a location of the second display region, wherein a signal designating user input received on the first display region and a signal designating user input received on the second display region, are filtered from the first operating system.

2. The device of claim 1, wherein the processor is configured to control the display to increase or decrease a size of the first display region or a size of the second display region in accordance with a predetermined input signal.

3. The device of claim 1, wherein the processor is further configured to control to copy an object from the first display region and display the copied object on the second display region, in response to a third user input.

4. The device of claim 1, wherein the processor is further configured to set an interface for switching from the first operating system to the second operating system according to a selection input of a user from among interfaces for switching the plurality of operating systems.

5. The device of claim 4, wherein, in response to receiving a user input according to the interface for switching from the first operating system to the second operating system, the processor is further configured to control the first operating system to be in an inactive state and to change a state of the second operating system to an active state.

6. A method of executing a plurality of operating systems in a device configured to execute the plurality of operating systems, the method comprising:

controlling a display to display an operation screen of a first operating system when the first operating system is activated;

based on receiving a first user input tracing an outline on the display, controlling to activate a second operating system;

controlling the display to display the operation screen of the first operating system on a first display region of the display and to display the operation screen of the second operating system on a second display region of the display, the second display region being defined by a size of the outline and a location of the outline; and based on receiving a second user input, controlling the display to change at least one of a size of the second display region and a location of the second display region, wherein a signal designating user input received on the first display region and a signal designating user input received on the second display region, are filtered from the first operating system.

7. The method of claim 6, further comprising increasing or decreasing at least one among a size of the first display region or a size of the second display region in accordance with a predetermined input signal.

8. The method of claim 6, further comprising:

in response to a third user input, controlling to copy an object from the first display region and display the copied object on the second display region.

9. The method of claim 6, further comprising setting an interface for switching from the first operating system to the second operating system according to a selection input of a user from among interfaces for switching between the plurality of operating systems.

10. The method of claim 9, further comprising controlling the first operating system to be in an inactive state and changing a state of the second operating system to an active state in response to receiving a user input according to the interface for switching from the first operating system to the second operating system.

11. A non-transitory computer-readable recording medium having embodied thereon a computer program for executing a method comprising:

controlling a display to display an operation screen of a first operating system when the first operating system is activated;

based on receiving a first user input tracing an outline on the display, controlling to activate a second operating system;

controlling the display to display the operation screen of the first operating system on a first display region of the display and to display the operation screen of the second operating system on a second display region of the display, the second display region being defined by a size of the outline and a location of the outline; and based on receiving a second user input, controlling the display to change at least one of a size of the second display region and a location of the second display region, wherein a signal designating user input received on the first display region and a signal designating user input received on the second display region, are filtered from the first operating system.

* * * * *